(12) United States Patent
Nordyke et al.

(10) Patent No.: US 12,175,528 B2
(45) Date of Patent: *Dec. 24, 2024

(54) TRANSACTION RETRIEVAL, TRANSACTION MATCHING, ALERT GENERATION, AND PROCESSING OF DISPUTE ALERTS

(71) Applicant: Midigator LLC, American Fork, UT (US)

(72) Inventors: Eric Nordyke, St. Thomas, VI (US); Corey Baggett, St. Thomas, VI (US); Benjamin Hale, St. Thomas, VI (US)

(73) Assignee: Midigator, LLC, American Fork, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,285

(22) Filed: May 1, 2023

(65) Prior Publication Data

US 2023/0267537 A1 Aug. 24, 2023

Related U.S. Application Data

(63) Continuation of application No. 16/786,843, filed on Feb. 10, 2020, now Pat. No. 11,669,894, which is a
(Continued)

(51) Int. Cl.
*G06F 17/30* (2006.01)
*G06F 16/955* (2019.01)
(Continued)

(52) U.S. Cl.
CPC .......... *G06Q 40/02* (2013.01); *G06F 16/955* (2019.01); *G06Q 10/10* (2013.01); *G06Q 20/407* (2013.01);
(Continued)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 2006/0218091 A1* | 9/2006 | Choy | G06Q 20/02 705/40 |
| 2010/0138326 A1* | 6/2010 | Joao | G06Q 40/12 709/204 |

(Continued)

OTHER PUBLICATIONS

U.S. Appl. No. 16/786,843, "Advisory Action", Jul. 29, 2022, 3 pages.
(Continued)

*Primary Examiner* — Hung D Le
(74) *Attorney, Agent, or Firm* — Kilpatrick Townsend & Stockton LLP

(57) ABSTRACT

The subject matter disclosed herein provides methods for downloading chargeback records. For example, the method may include selecting a merchant from a first web portal associated with a first financial institution and providing first authentication information associated with the merchant and the first financial institution into the first web portal. The method may then include accessing, via the first web portal, first chargeback records for the merchant. Additionally, the method can include selecting the merchant from a second web portal associated with a second financial institution and providing second authentication information associated with the merchant and with the second financial institution into the second web portal. The second authentication information can be different than the first authentication information. Then, the method can include accessing second chargeback records for the merchant. Finally, the method can include downloading the first chargeback records and the second chargeback records to a database.

14 Claims, 22 Drawing Sheets

Related U.S. Application Data continuation-in-part of application No. 15/191,331, filed on Jun. 23, 2016, now abandoned, and a continuation-in-part of application No. 14/292,471, filed on May 30, 2014, now Pat. No. 9,600,845, and a continuation-in-part of application No. 14/292,513, filed on May 30, 2014, now abandoned, and a continuation-in-part of application No. 14/292,496, filed on May 30, 2014, now abandoned.

(51) Int. Cl.
    *G06Q 10/10*  (2023.01)
    *G06Q 20/40*  (2012.01)
    *G06Q 40/02*  (2023.01)
    *G06Q 40/12*  (2023.01)
    *H04L 9/40*   (2022.01)
    *H04L 67/12*  (2022.01)

(52) U.S. Cl.
    CPC ........... *G06Q 40/12* (2013.12); *H04L 63/083* (2013.01); *H04L 67/12* (2013.01)

(56) References Cited

U.S. PATENT DOCUMENTS

| | | | | |
|---|---|---|---|---|
| 2010/0274723 | A1* | 10/2010 | Joao | G06Q 30/06 705/44 |
| 2013/0253956 | A1 | 9/2013 | Towne et al. | |
| 2013/0297492 | A1* | 11/2013 | Ertresvaag | G06Q 20/389 705/39 |
| 2014/0214669 | A1* | 7/2014 | Holenstein | G06Q 20/3827 705/44 |
| 2014/0279312 | A1* | 9/2014 | Mason | G06Q 20/407 705/30 |
| 2014/0316960 | A1* | 10/2014 | Katepally | G06Q 40/02 705/35 |
| 2014/0358789 | A1* | 12/2014 | Boding | G06Q 20/405 705/44 |
| 2015/0235187 | A1* | 8/2015 | Brunet | G06Q 20/08 705/44 |
| 2017/0103399 | A1* | 4/2017 | Napsky | G06Q 20/3226 |

OTHER PUBLICATIONS

U.S. Appl. No. 16/786,843, "Final Office Action", Mar. 29, 2022, 9 pages.
U.S. Appl. No. 16/786,843, "Non-Final Office Action", Oct. 14, 2022, 7 pages.
U.S. Appl. No. 16/786,843, "Notice of Allowance", Feb. 1, 2023, 10 pages.

* cited by examiner

SELECT CHARGEBACK FILTERS

- 361 ■ Transaction Date:
  - From 2/13/2014, To 2/14/2014
- 363 ■ Credit Card Number  123-456-789
- 365 ☐ Credit Card Type
- 367 ☐ Merchant ID (MID)
- 369 ☐ Transaction / Chargeback Amount
- 371 ☐ Chargeback Reference No.

DOWNLOAD DETAILS

- 373 ☐ CSV
- 375 ■ Spreadsheet File

377 [Download]

| Chargeback Reference No. | Merchant ID | Credit Card Type | Credit Card No. | Transaction/ Chargeback Amount | Transaction Date | Report Date | Reason Code | Customer Service Notes | Terms and Conditions |
|---|---|---|---|---|---|---|---|---|---|
| 153205 | 246815 | Visa | 123-456-789 | 51.25 | 2/13/2014 | 2/17/2014 | D2 - Improper fit. | Buyer called on 2/19/14 regarding return | See attachment |
| 354805 | 246815 | MasterCard | 123-456-789 | 787.11 | 2/14/2014 | 2/18/2014 | A2 - No longer needed. | | See attachment |

FIG. 3E

CHARGEBACK RECORD — 410

| Chargeback Reference No. | Merchant ID | Credit Card Type | Credit Card No. | Transaction/ Chargeback Amount | Transaction Date | Report Date | Reason Code | Customer Service Notes | Terms and Conditions |
|---|---|---|---|---|---|---|---|---|---|
| 1532205 | 246815 | Visa | 123-456-789 | 51.25 | 2/13/14 | 2/17/2014 | D2 - Improper fit | Buyer called on 2/19/14 regarding return | See attachment |

POSSIBLE MATCHES WITH TRANSACTION RECORD — 411

| Purchase Order No. | Merchant ID | Credit Card Type | Credit Card No. | Transaction/ Chargeback Amount | Customer Name | Transaction Amount | Transaction Date | Action |
|---|---|---|---|---|---|---|---|---|
| 365S32 | 246815 | Visa | 123-456-789 | | Melissa Moore | 5.45 | 2/13/2014 | ☐ Confirm ■ Delete |
| 425D89 | 246815 | | 123-456-789 | | Melissa Moore | 99.09 | 2/13/2014 | ☐ Confirm ■ Delete |
| 984C53 | 246815 | Visa | 123-456-789 | | Melissa Moore | 1532.55 | 2/13/2014 | ☐ Confirm ■ Delete |
| 285A99 | 246815 | | 123-456-789 | | Melissa Moore | 51.25 | 2/13/2014 | ■ Confirm ☐ Delete |

CHARGEBACK RECORD — 430

| Chargeback Reference No. | Merchant ID | Credit Card Type | Credit Card No. | Transaction/ Chargeback Amount | Transaction Date | Report Date | Reason Code | Customer Service Notes | Terms and Conditions |
|---|---|---|---|---|---|---|---|---|---|
| 1532205 | 246815 | Visa | 123-456-789 | 51.25 | 2/13/2014 | 2/17/2014 | D2 - Improper fit | Buyer called on 2/19/14 regarding return | See attachment |

NO MATCHING TRANSACTION RECORDS — 431

FIG. 4C

| Merchant ID | Account Alias | Visa Chargebacks | MasterCard Chargebacks | Total Chargebacks | Number of Transactions | Chargeback Ratio | Chargeback Dollar Ratio |
|---|---|---|---|---|---|---|---|
| 12DAX153 | Store 1 | 42 | 35 | 77 | 1174 | 6.56 | 2.65 |
| 35DLC876 | Store 2 | 85 | 12 | 97 | 265 | 36.60 | 2.2 |
| 40XAS453 | Store 3 | 11 | 86 | 97 | 189 | 51.32 | 1.75 |

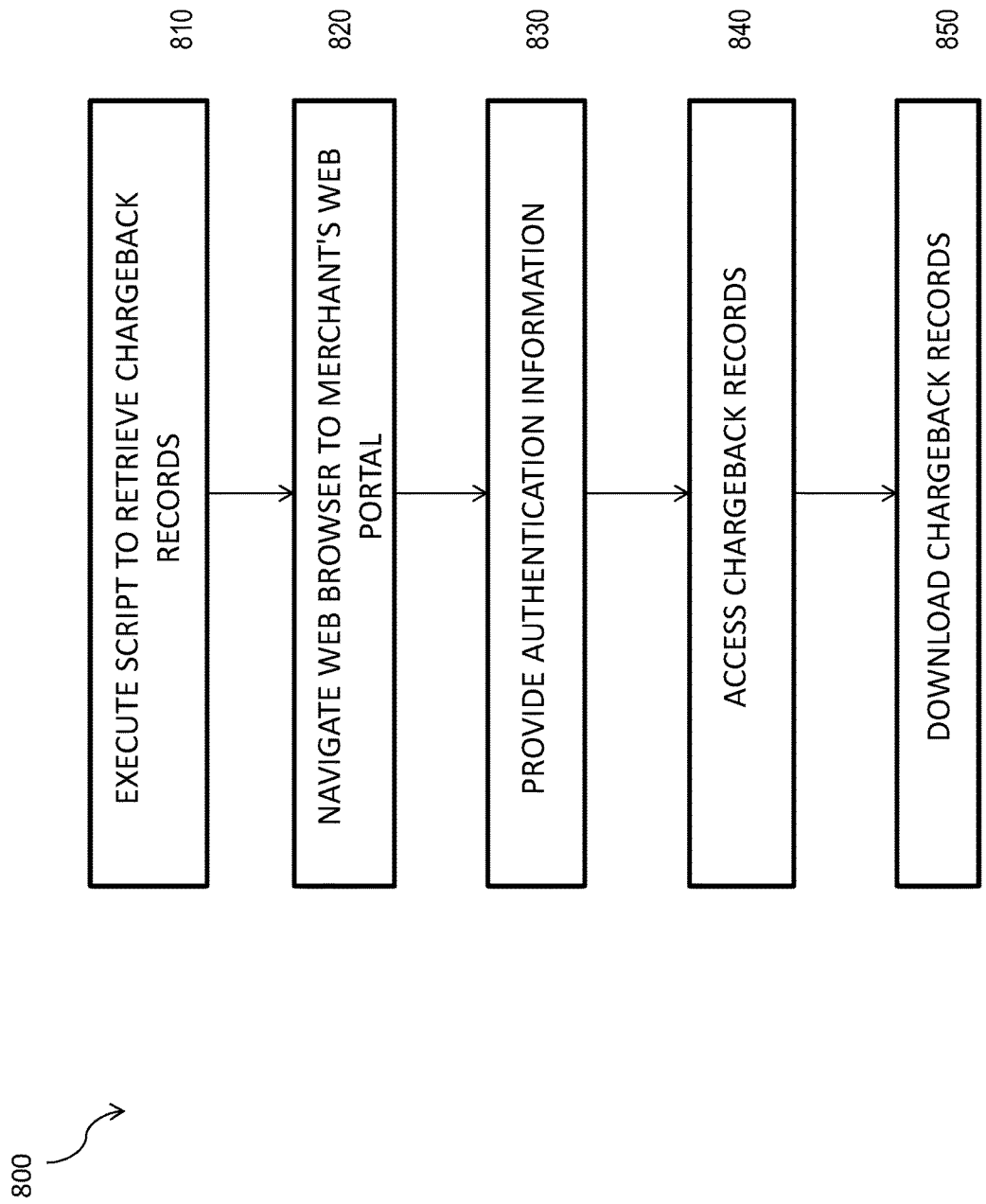

TRANSACTION RETRIEVAL, TRANSACTION MATCHING, ALERT GENERATION, AND PROCESSING OF DISPUTE ALERTS

CROSS-REFERENCES TO RELATED APPLICATIONS

This is a continuation of, and claims priority to, U.S. patent application Ser. No. 16/786,843, filed Feb. 10, 2020, which is a continuation-in-part of and claims priority to U.S. patent application Ser. No. 14/292,471, filed May 30, 2014; U.S. patent application Ser. No. 14/292,496, filed May 30, 2014; U.S. patent application Ser. No. 14/292,513, filed May 30, 2014; and U.S. patent application Ser. No. 15/191,331, filed Jun. 23, 2016, the disclosures of each of which are hereby incorporated by reference herein in their entireties.

TECHNICAL FIELD

This disclosure relates generally to the processing of alerts, financial transactions and, more particularly, to the retrieval and matching of chargeback records with transaction records and the generation of alerts relating to chargebacks.

BACKGROUND

Payment cards, such as credit cards and debit cards, are commonly used in retail transactions. In these transactions, a customer may purchase a good or service from a merchant using a payment card. If the customer is unhappy with the purchase or simply does not recognize the charge, he/she may initiate a chargeback with a merchant processor or a card issuing bank in order to dispute the charge or to request more information about the charge. In some situations, the merchant processor or bank may levy a financial penalty on merchants having a large number of chargebacks. These chargebacks can become extremely costly to merchants as they can result in a loss of the transaction's dollar amount as well as internal handling costs.

A chargeback occurs when a payment cardholder disputes a transaction with a merchant processor or a card issuing bank. For example, the cardholder may not recognize a transaction that arose through error (e.g., the processor's and/or issuer's technical or clerical mishap) or fraud (e.g., identity theft by a malicious third party). The cardholder may also dispute a transaction for quality reasons (e.g., non-delivery, inferior goods or services). But regardless of the reason, a disputed transaction can trigger a chargeback process that is particularly onerous for a merchant. For instance, the typical chargeback process allows the merchant's bank to investigate and determine the legitimacy of the disputed transaction before the merchant is afforded an opportunity to refute the chargeback. Moreover, the merchant processor or issuing bank can charge the merchant with a processing fee for each chargeback and levy additional fines when the merchant incurs a large number of chargebacks. In extreme cases, a large number of chargebacks can even cause the merchant of payment card (e.g., credit and/or debit) processing privileges altogether.

SUMMARY

In some implementations, methods, apparatus, systems, and computer program products are provided for executing a script to retrieve one or more chargeback records.

In one aspect, a system may also select at least one merchant from among a first plurality of merchants available for selection from a first web portal associated with a first financial institution and may provide first authentication information associated with the at least one merchant and with the first financial institution into the first web portal. Subsequent to providing the first authentication information, the system may access, via the first web portal, first chargeback records for at least one merchant. Additionally, the system may select the at least one merchant from among a second plurality of merchants available for selection from a second web portal associated with a second financial institution and may provide second authentication information associated with the at least one merchant and with the second financial institution into the second web portal. The second authentication information may be different than the first authentication information. Then, subsequent to providing the second authentication information, the system may access, via the second web portal, second chargeback records for the at least one merchant. Finally, the system may download the first chargeback records and the second chargeback records to a database. The first and second chargeback records can represent a return of funds to one or more purchasers by the one or more financial institutions.

The above methods, apparatus, systems, and computer program products may, in some implementations, further include one or more of the following features in any feasible combination.

For example, the system may access a plurality of transaction records for the at least one merchant. The system may also execute a comparison process to compare each transaction record of the plurality of transaction records to each chargeback record of the first chargeback records and the second chargeback records.

The executing the comparison process may include detecting a match between a particular transaction record of the plurality of transaction records and a particular chargeback of the first chargeback records or the second chargeback records. The executing the comparison process may also include, in response to detecting a match, generating a representation package.

The representation package may include a plurality of sections such as a cover letter, order details, a delivery verification, and a checkout page.

The system may also receiving, from the at least one merchant, a request for a chargeback report.

The system may generate the chargeback report based on the first chargeback records or the second chargeback records in response to receiving the request.

The first authentication information can include a first username and a first password associated with the at least one merchant and the first financial institution and the second authentication information can include a second username and a second password associated with the at least one merchant and the second financial institution The downloading the first chargeback records and the second chargeback records to the database can include saving the first chargeback records or the second chargeback records to the database as a character-separated values file or as a file for a spreadsheet application.

The above methods, apparatus, systems, and computer program products may, in some implementations, further include one or more of the following features in any feasible combination.

The one or more chargeback data values may include one or more mandatory data values and one or more informational data values. The matching may be based on the one or more mandatory data values.

The one or more mandatory data values may be selected from a group consisting of a merchant ID, a credit card type, a credit card number, a transaction/chargeback amount, and a transaction date.

The one or more informational data values may be selected from a group consisting of a chargeback reference number, a report date, a reason code, a transaction type, a bin number, a transaction history, one or more customer service notes, and one or more terms and conditions associated with the one or more purchases.

An exact match between a chargeback record and a transaction record may be displayed. The exact match may occur when all of the mandatory data values have a matching transaction data value.

The server may be updated by tagging the transaction record associated with the exact match as a chargeback transaction. A purchaser associated with the transaction record may be added to a blacklist of chargeback customers.

A possible match between a chargeback record and a transaction record may be displayed. The possible match may occur when a subset of the mandatory data values matches the one or more transaction data values.

An input indicating that the possible match is an actual match may be received.

The server may be updated by tagging the transaction record associated with the actual match as a chargeback transaction. The purchaser associated with the transaction record may be added to a blacklist of chargeback customers.

A document may be generated based on the matching. The document may be generated using the one or more informational data values and may provide one or more details regarding a purchase.

In some implementations, methods, apparatus, systems, and computer program products are provided for generating alerts.

In one aspect, one or more alerts are maintained for one or more merchants. Each alert has one or more conditions relating to one or more chargebacks. The one or more chargebacks represent a return of funds to one or more purchasers for a purchase from the one or more merchants. For each alert, a determination is made as to whether the one or more conditions are satisfied, and an alert is sent to the one or more merchants based on the determination.

The above methods, apparatus, systems, and computer program products may, in some implementations, further include one or more of the following features in any feasible combination.

At least one of the conditions may be satisfied when a quantity of chargebacks exceeds a threshold value during a predetermined period of time. The quantity of chargebacks may relate to a specific account.

At least one of the conditions may be satisfied when a quantity of chargebacks for a first account is greater than a quantity of chargebacks for a second account during a predetermined period of time.

At least one of the conditions may be satisfied when a quantity of chargebacks is greater than a total number of transactions during a predetermined period of time.

At least one of the conditions may be satisfied when a chargeback amount is a predetermined percentage greater than a transaction dollar amount during a predetermined period of time.

The alert may be sent to the one or more merchants via a text message or an e-mail. Methods, systems, and articles of manufacture, including computer program products, are provided for processing one or more dispute alerts. In some example embodiments, there is provided a method that includes: receiving, from a dispute alert provider, a dispute alert indicating a disputed transaction, wherein the dispute alert includes a first plurality of transaction descriptors characterizing the disputed transaction; executing, in response to the received dispute alert, a first web service request to retrieve a first recorded transaction from a customer relationship management system, wherein the first recorded transaction is characterized by a second plurality of transaction descriptors; determining whether the disputed transaction matches the first recorded transaction at least by generating a weighted sum of at least one transaction descriptor from the first plurality of transaction descriptors that matches a transaction descriptor from the second plurality of transaction descriptors; and executing, when the disputed transaction matches the first recorded transaction, a second web service request to cause the customer relationship management system to issue a refund for the disputed transaction.

In some variations, the first plurality of transaction descriptors may indicate at least one of a date and time when the disputed transaction was executed, a merchant that processed the disputed transaction, an amount of the disputed transaction, a status of the disputed transaction, a currency of the disputed transaction, and a reason for the disputed transaction. The method may further include receiving, in response to executing the first web service, the first recorded transaction provided by the customer relationship management system. The first web service may be executed by least calling a Hypertext Transfer Protocol GET request. The determining may further include: generating the weighted sum to include a weight assigned to the at least one transaction descriptor from the first plurality of transaction descriptors that matches a transaction descriptor from the second plurality of transaction descriptors; and determining whether the weighted sum exceeds a threshold. The second web service may be executed by at least calling a Hypertext Transfer Protocol PUT request.

In some variations, the method may further include: receiving, from a merchant associated with the customer relationship management system, one or more recorded transactions; storing, in a relational database, one or more recorded transactions received from the merchant; and retrieving, from the relational database, a second recorded transaction, wherein the retrieving includes executing one or more Structured Query Language operations; and determining whether the disputed transaction matches the second recorded transaction retrieved from the relational database.

In some variations, the method may further include: executing, when the disputed transaction is determined to match the first recorded transaction, a third web service request to determine whether the disputed transaction has already been refunded and/or canceled by the customer relationship management system; and executing, when the disputed transaction is determined to match the first recorded transaction, the second web service request to cause the customer relationship management system to issue the refund when the disputed transaction has not already been refunded and/or canceled by the customer relationship management system. The third web service request may be executed by at least calling a Hypertext Transfer Protocol GET request.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

FIGS. 3B and 3C illustrate different web pages in a bank's web portal, in accordance with some example implementations;

FIG. 3D illustrates a user interface for accessing chargeback records from a bank's web portal, in accordance with some example implementations;

FIG. 3E illustrates a chargeback record, in accordance with some example implementations;

FIGS. 4A, 4B, and 4C illustrate different user interfaces directed to different match scenarios, in accordance with some example implementations;

FIG. 8 illustrates a process for downloading a merchant's chargeback records, in accordance with some example implementations;

Like reference symbols in the various drawings indicate like elements.

DETAILED DESCRIPTION

Figure 1:
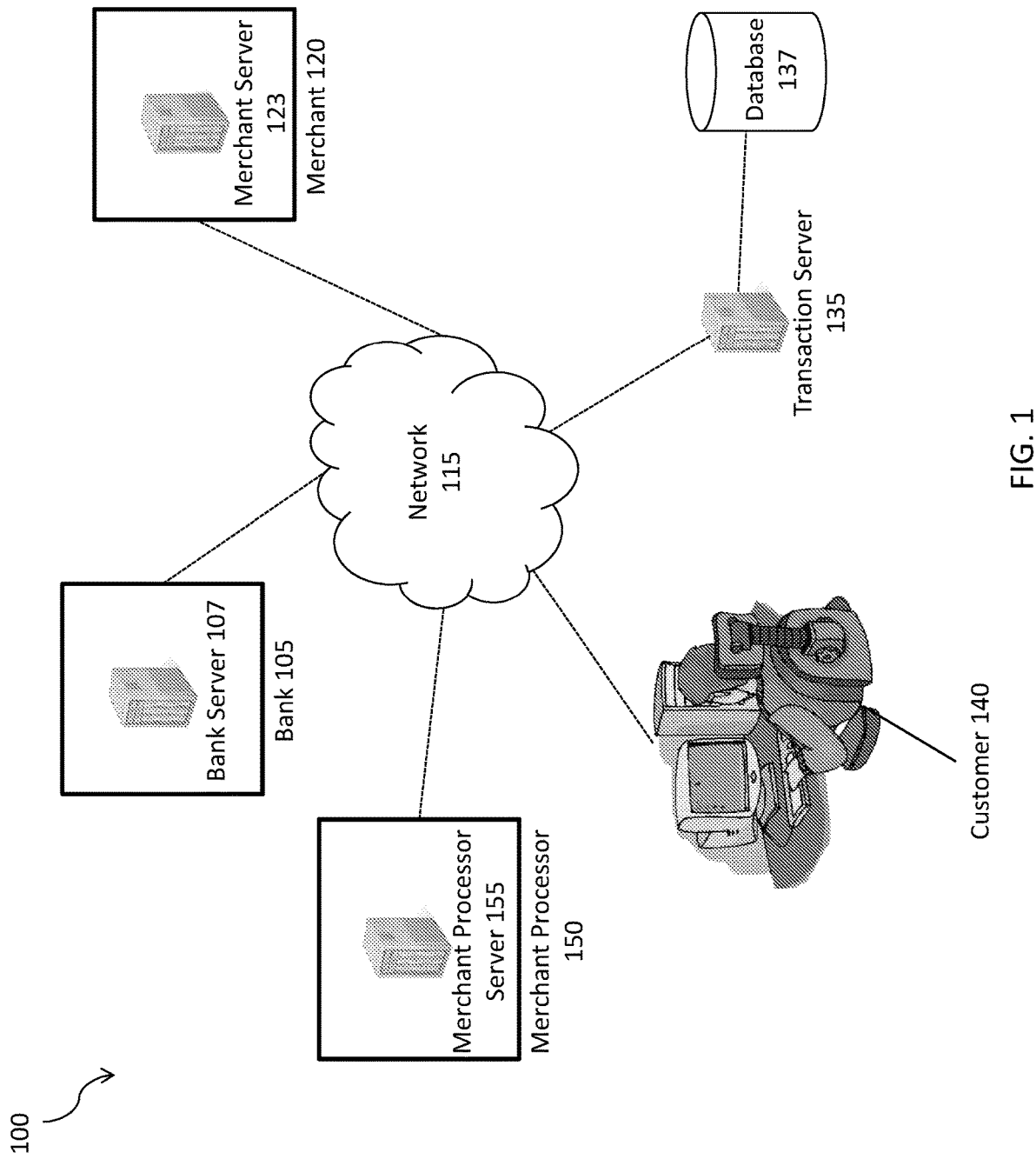
FIG. 1 illustrates a system for retrieving and processing chargeback records and generating a representation package, in accordance with some example implementations.

FIG. 1 illustrates a system 100 for retrieving and processing chargeback records and generating a representation package in order to contest chargebacks. System 100 may include a merchant 120 connected to a network 115, such as the Internet. During the course of business, merchant 120 may sell goods or services to customer 140 via network 115. Records of these transactions may be saved at merchant server 123. Each transaction record may be characterized by various data values including, for example, a purchase order number, a merchant identifier, the type of credit card used during the transaction, a credit card number, a transaction amount, a transaction date, delivery information (e.g., a tracking number), and the like. In some implementations, merchant server 123 may be a customer relationship manager application server.

After the transaction record is saved to merchant server 123 and payment for the transaction is processed, merchant 120 may send the purchased goods or services to customer 140. If customer 140 is dissatisfied with the goods or services purchased from merchant 120 or does not recognize the transaction for the purchase on his/her bank statement, the customer may initiate a chargeback with a financial institution, such as bank 105, in order to obtain a payment refund or request more information regarding the transaction. In some implementations, a third party merchant processor 150 may handle chargebacks on behalf of bank 105. Upon refunding the payment to customer 125, bank 105 or merchant processor 150 may request reimbursement of the same from merchant 120. In some implementations, bank 105 may memorialize the return of funds as a chargeback record and store the chargeback record at bank server 107. Additionally or alternatively, this chargeback record may be stored at merchant processor server 155. Transaction server 135 may access the chargeback record from bank server 107 or from merchant processor server 155 via network 115 and download the chargeback record to database 137 for further processing as described below.

While system 100 illustrates a single merchant 120, a single bank 105, a single merchant processor 150, and a single customer 140, any number of merchants, banks, merchant processors, and customers may be present. As the number of sales between merchants and customers increases, the number of chargebacks may also increase. Transaction server 135 provides a user friendly mechanism for managing and contesting chargebacks in an automated manner and for alerting merchants of the same.

Figure 2:
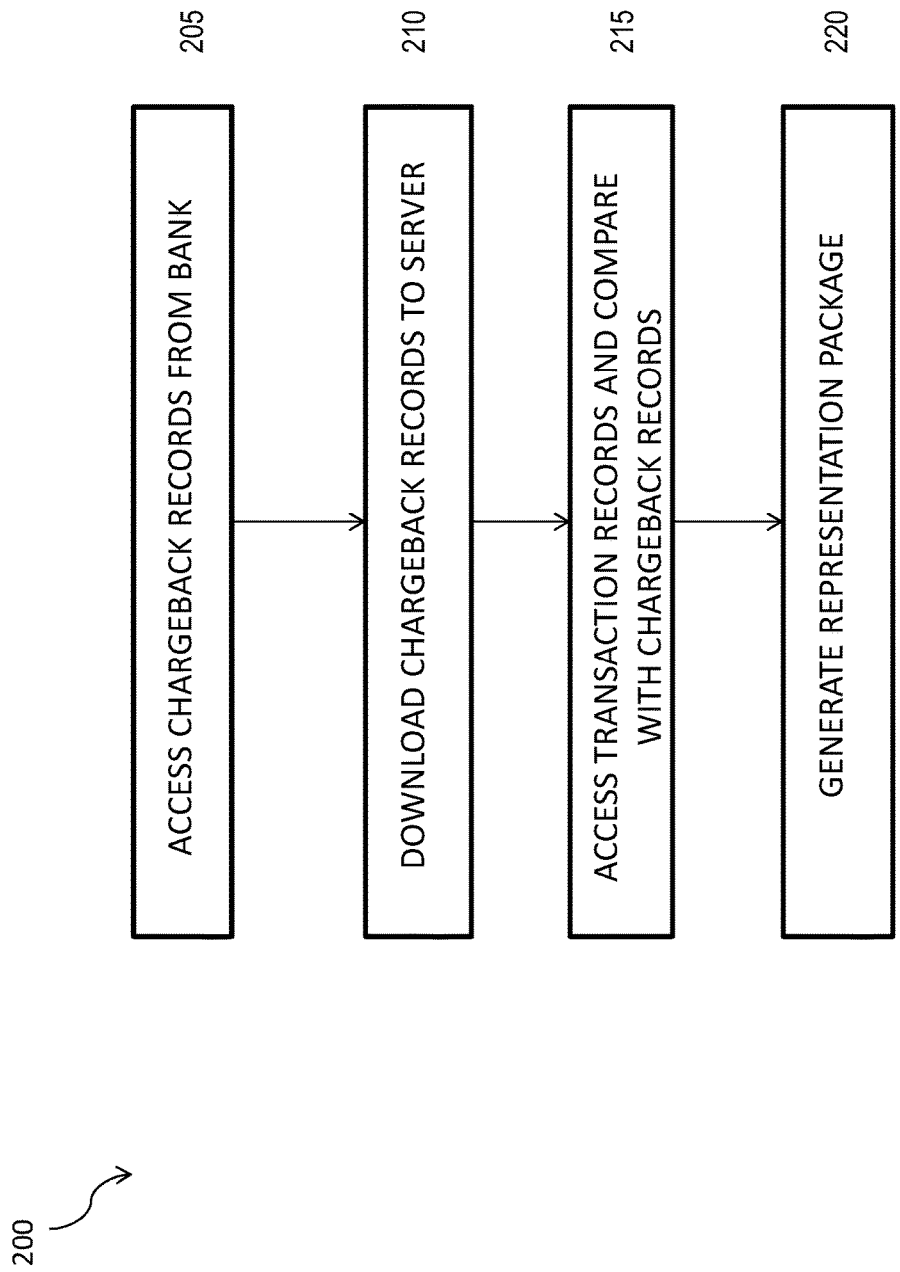
FIG. 2 illustrates a flowchart for contesting chargebacks, in accordance with some example implementations.

FIG. 2 illustrates a flowchart 200 for contesting chargebacks. In some implementations, the processes of flowchart 200 may be performed by transaction server 135. These processes are described below with reference to FIGS. 3A-3E, 4A-4C, and 5.

At 205, transaction server 135 may access chargeback records for a merchant. As explained above with respect to FIG. 1, these chargeback records may be stored at bank server 107. In some implementations, these chargeback records may be stored at merchant processor server 155. In a system having multiple banks and multiple merchants, each merchant may have accounts with different banks. In order to keep track of each merchant's bank accounts, transaction server 135 may maintain this information in merchant profiles. These profiles may be stored in database 137.

Figure 3A:
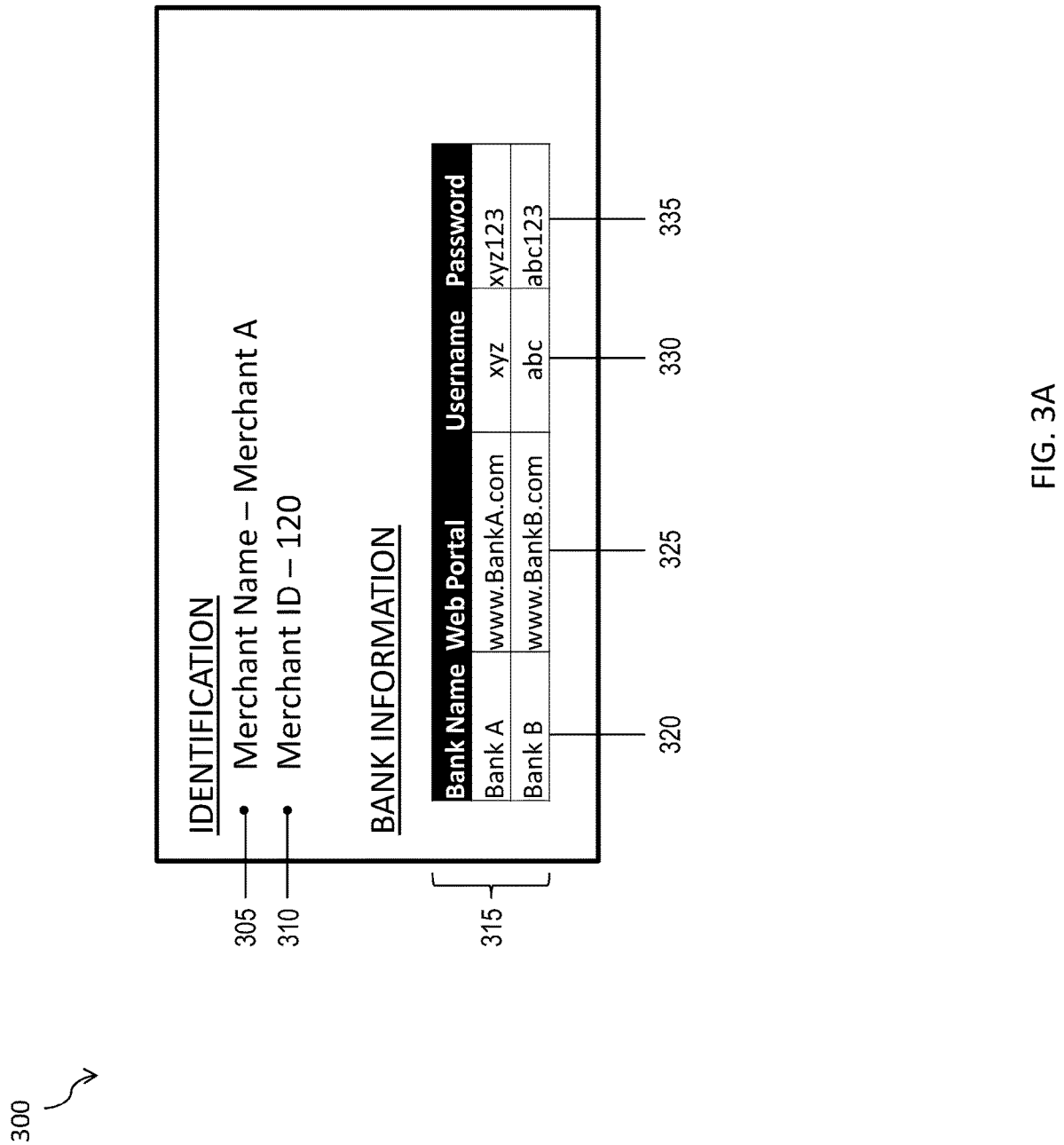
FIG. 3A illustrates a merchant profile, in accordance with some example implementations.

FIG. 3A illustrates an exemplary merchant profile 300 which may include identification information and bank information for a particular merchant. Identification information may include a merchant name 305 and a merchant identifier 310. The merchant identifier may be a merchant ID, for example. Bank information may include details regarding the banks at which the merchant has an account. As illustrated in table 315, bank information may include a bank name 320, a web portal 325 associated with the bank, and authentication information for logging onto the bank's web portal. Web portal 325 may be a bank's website and may be represented by a universal resource locator (URL), for example. Authentication information may include a username 330 and a password 335. In implementations where a merchant processor processes chargebacks on behalf of a bank, table 315 may include information regarding the merchant processor. In some implementations, a separate table may be used for merchant processors. The information in these tables may include, for example, the merchant processor's name, web portal, and authentication information for logging onto the merchant processor's web portal (e.g., a username and password).

In the implementation of FIG. 3A, merchant 120 may have accounts at Bank A and Bank B. In order to access chargeback data for merchant 120, transaction server 135 may need to visit each bank's web portal. In some implementations, this process may be automated using a script. Because each bank's web portal may have different web pages and, consequently, different content, a different script can be written for each bank. Transaction server 135 may be configured to execute this script upon request (e.g., when merchant 120 requests a chargeback report) or automatically based on a predetermined event. With regard to the latter, transaction server 135 may be configured to execute the script for merchant 120 at a specified time or after a predetermined period of time, for example.

The script may include commands to cause transaction server 135 to launch a web browser and to log onto each bank's web portal 325. For example, these commands may cause the web browser to first visit Bank A's web portal (www.BankA.com) and retrieve chargeback records from Bank A before proceeding to Bank B's web portal to do the same. In some implementations, the web browser may be instructed to visit each bank's portal in accordance with one or more predetermined schedules. For example, the web browser may be instructed to visit Bank A's web portal every 24 hours and visit Bank B's web portal every 12 hours.

FIG. 3B illustrates an exemplary web portal 340 for Bank A. Upon reaching web portal 340, the script may cause the web browser to authenticate the merchant's identity. Referring to the authentication information for Bank A in table 315, the web browser may enter "xyz" as a username in field 341 and "xyz123" as a password in field 343. The web browser may submit this authentication information by selecting button 345. In some implementations, the authentication information may be provided over a secure connection that uses, for example, transport layer security, a secure sockets layer, and the like.

Upon successfully verifying the authentication information, bank server 307 may display user interface 350 illustrated in FIG. 3C. User interface 350 may identify different actions available to a merchant. For example, a merchant may review its statements (by selecting button 351), review batches of daily deposits to his/her accounts (by selecting button 353), search for transactions (by selecting button 355), search for chargeback records (by selecting button 357), or request support (by selecting button 359). Because transaction server 135 is interested in accessing chargeback records, the script may cause the web browser to select button 357 to view the merchant's chargeback records.

FIG. 3D illustrates a user interface 360 for accessing chargeback records from a bank's web portal. User interface 360 may include several chargeback filters. These chargeback filters may be selected to specify one or more desired attributes of chargeback records to be retrieved. For example, if chargeback data is to be downloaded on a daily basis, the script can cause the web browser to choose transaction date filter 361 by selecting the adjacent box. Under the script's command, the web browser may then enter yesterday's date (e.g., "Feb. 2, 2014") and today's date ("Feb. 2, 2014"), for example, in the "from" and "to" fields, respectively. Making these selections enables bank server 107 to only retrieve chargeback records having these designated transaction dates. In another example, if a merchant is interested in only viewing chargeback records associated with a particular credit card number, the script can cause the web browser to select filter 363 and enter the desired credit card number in the adjacent field.

In the implementation of FIG. 3D, only the transaction date filter 361 and credit card number filter 363 are selected. However, other filters may be selected including, for example, a credit card type filter 365 (e.g., Visa®, MasterCard®, American Express®, etc.), a merchant ID filter 367 (to identify the merchant associated with the chargeback record), a transaction/chargeback amount filter 369 (to specify the amount of the transaction), and a chargeback reference number filter 371 (to identify the chargeback record).

After the desired filters are selected, the script may select a download file type. Chargeback records retrieved from bank server 107 may be saved or downloaded using a character-separated values (CSV) file (by selecting file type 373) or a file for a spreadsheet application, such as Microsoft Excel® (by selecting file type 375). In the implementation of FIG. 3D, the script may cause the web browser to select spreadsheet file type 375.

Chargeback records may be downloaded at 210. The script may initiate the download process by causing the web browser to select button 377 from user interface 360. In some implementations, the downloaded spreadsheet file may be saved to database 137.

FIG. 3E illustrates an exemplary spreadsheet file 380 downloaded from a bank portal. File 380 may include chargeback records 383 and 385. Each chargeback record may have a set of mandatory data values and informational data values. As described below, mandatory data values may be those data values required to match the chargeback record with a transaction record. Mandatory data values may include a merchant ID, a credit card type, a credit card number, a transaction/chargeback amount, and a transaction date. Informational data values, on the other hand, are those data values provided as background information. Informational data values may or may not be used during the matching process and may include a chargeback reference number, a report date (indicating when the chargeback was received by the bank), a reason code (indicating why the customer initiated the chargeback), customer service notes, and the terms and conditions associated with the purchase. In some implementations, chargeback records 383 and 385 may include additional informational data values such as a transaction type (e.g., a card sale), a bin number associating the cardholder to a particular issuing bank, and a transaction history.

In order to decide which chargeback records to contest, transaction server 135 may compare the downloaded chargeback records with the merchant's transaction records at 215. If a matching transaction record is found for a particular chargeback record, then transaction server 135 may contest the chargeback. If no matching transaction record is found, then transaction server 135 may not contest the chargeback.

As explained above with respect to FIG. 1, a merchant may store its transaction records at merchant server 123. Transaction server 135 may access these transaction records via network 115 at 215. Upon obtaining these transaction records, transaction server 135 may compare these records with the downloaded chargeback records. During this comparison process, transaction server 135 may find, for example, an exact match between a chargeback record and a transaction record. If, however, transaction server 135 is unable to find an exact match, the transaction server may propose one or more candidate transaction records as possible matches. In some situations, transaction server 135 may be unable to find any matches at all. Each match scenario is described below.

Figure 4A:
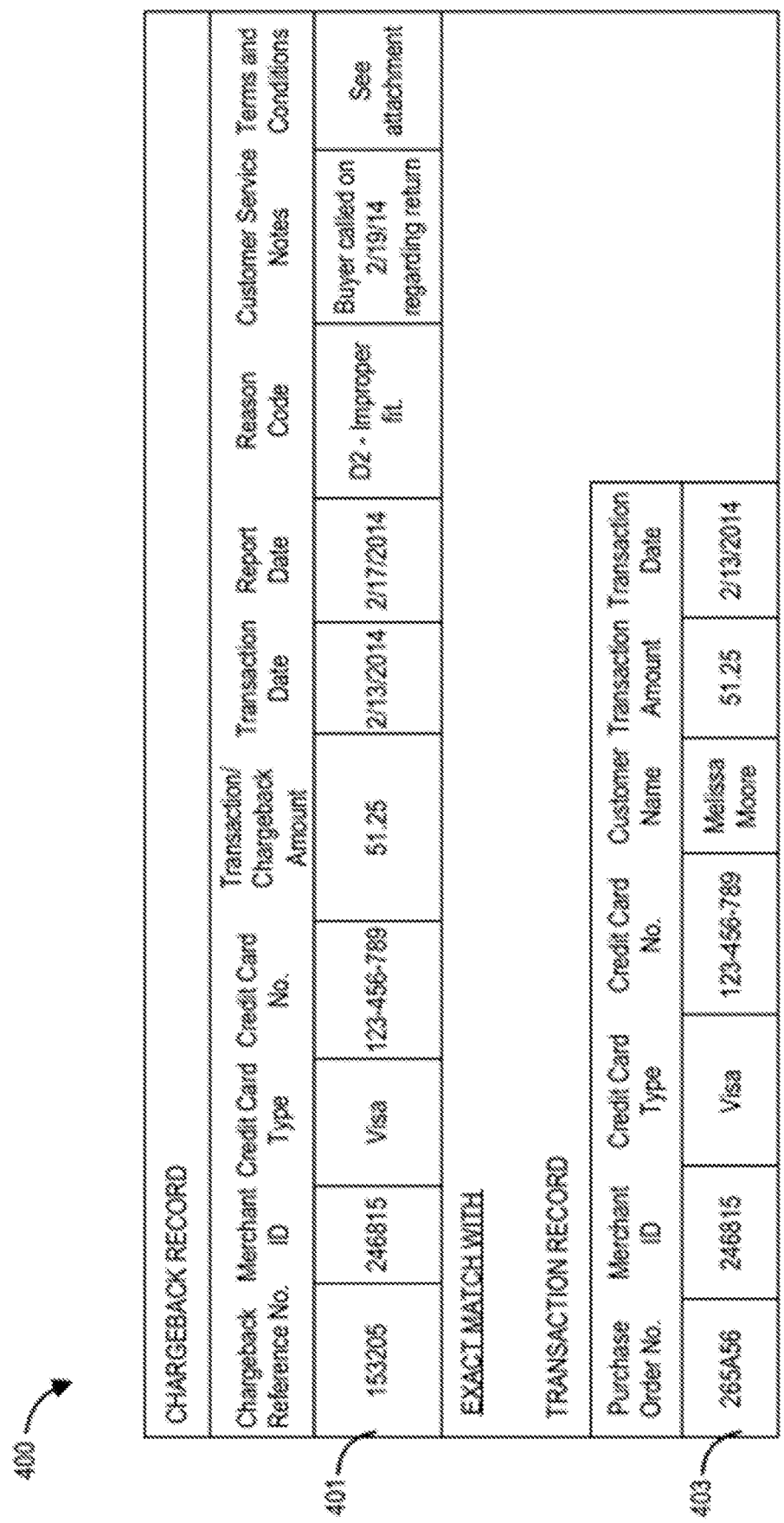

An exact match may occur when all of the mandatory data values in the chargeback record have a matching data value in the transaction record. FIG. 4A illustrates a user interface 400 displaying an exact match between a chargeback record 401 and a transaction record 403. In this example, all of the mandatory data values in chargeback record 401 (i.e., the merchant ID, credit card type, credit card number, transaction/chargeback amount, and transaction date) have a matching transaction record data value.

A possible match may occur when a subset of the mandatory data values in the chargeback record matches the data values in the transaction record. FIG. 4B illustrates a user interface 410 displaying a possible match between chargeback record 411 with transaction records 413, 415, 417, and 419. These transaction records 413, 415, 417, and 419 may be possible matches (rather than exact matches) because their data values do not match all of the mandatory data values of chargeback record 411. For example, the transaction/chargeback amount for chargeback record 411 and transaction record 413 may not be the same. In another example, the credit card type and transaction/chargeback amount for chargeback record 411 and transaction record 415 may not be the same. Transaction server 135 may propose transaction records 413, 415, 417, and 419 as possible candidate matches based on their similarity with chargeback record 411. This similarity may be based, for example, on the number of transaction record data values that matches the mandatory data values. An administrator may set the number of matching data values required to form a possible match. Transaction server 135 may use this predetermined number to determine which candidate transaction records to propose. For example, if this predetermined number is set to two, then transaction server 135 may only propose those transaction records that have two or more matching mandatory data values.

Transaction server 135 may prompt the user to manually review the proposed transaction records in order to determine whether any of the possible matches are an actual match. A user may utilize action buttons 421 to either confirm that a transaction record is an actual match (by selecting the "confirm" option) or reject a transaction record from further consideration (by selecting the "delete" option). In the example of FIG. 4B, a user may inspect the proposed transaction records and determine that transaction record 419 is an actual match with chargeback record 411. This determination may be based on the matching transaction/chargeback amounts, for example. Upon making this determination, the user may select the "confirm" option for transaction record 419 and select the "delete" option for transaction records 413, 415, and 417.

In some situations, transaction server 135 may be unable to propose any transaction records as possible matches. This situation may arise if, for example, none of the transaction records from merchant server 123 possesses the required number of matching data values as described above. Transaction server 135 may display user interface 430 of FIG. 4C to indicate that no matching transaction records are found for chargeback record 431.

After an exact match is found or an actual match is confirmed, transaction server 135 may tag the corresponding transaction record in merchant server 123 as a chargeback transaction. In addition, transaction server 135 may add the customer associated with the chargeback transaction to a blacklist of chargeback customers. This blacklist may include, for example, a list of customers who have initiated a chargeback. In some implementations, this list may be limited to customers who have initiated a predetermined number of chargebacks during a predetermined period of time. This list may also include the credit card numbers used for these transactions. This list may be made available to merchants on a subscription basis. Maintaining this list may help merchants avoid transactions with customers having a history of initiating chargebacks and to protect the merchants from potential fraud in the future.

Returning to FIG. 2, transaction server 135 may generate a representation package at 220 based on the match results from 215. In particular, transaction server 135 may generate a representation package for a transaction record that is an exact match or an actual match with a chargeback record. A representation package may be used to contest the chargeback. For example, if merchant 120 wants to contest a chargeback initiated by customer 140, transaction server 135 may generate a representation package that explains why the customer is not entitled to a refund. Transaction server 135 may then send the representation package to bank 105 or merchant processor 150 on the merchant's behalf.

Figure 5:
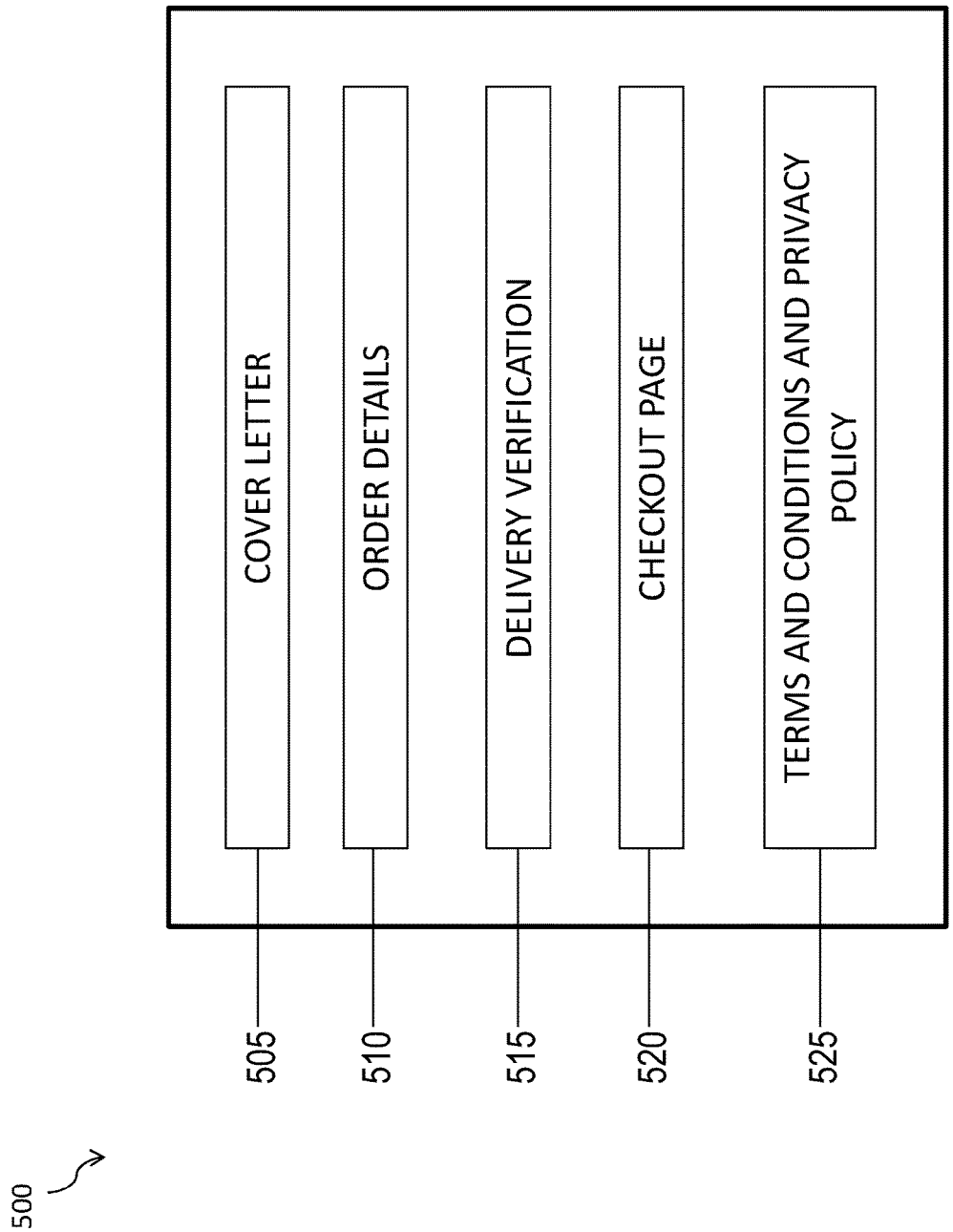
FIG. 5 illustrates a block diagram of a representation package, in accordance with some example implementations.

FIG. 5 illustrates a block diagram of an exemplary representation package 500 having sections 505, 510, 515, 520, and 525. Section 505 may include a cover letter explaining why customer 140 is not entitled to a refund. This cover letter may provide an overview of the transaction including, for example, the customer's name, when the transaction or purchase order was initiated, the IP address from which the purchase order was placed, the transaction/chargeback amount, a summary of the terms and conditions governing the transaction, and the like. Transaction server 135 may extract these details from the transaction record in merchant server 123 and insert these details into pre-designated fields in the cover letter.

Section 510 may include order details collected during the sale. These order details may include, for example, customer service notes from the merchant, notes or comments regarding the transaction from the customer, tracking numbers to demonstrate that the product was sent to customer 140, and the like. Transaction server 135 may obtain this information from merchant server 123.

Section 515 may include a screenshot from the postal service's web portal or a courier's web portal to demonstrate that the product was actually delivered to the customer. Transaction server 135 may obtain this information from merchant server 123. As explained above, the transaction records stored at merchant server 123 may include delivery information for each purchase order. This delivery information may include, for example, a shipment date, a tracking number for the shipment, a delivery address, an expected delivery date and time, and the like. Transaction server 135 may be configured to extract the delivery information from a transaction record, navigate a web browser to the postal service's web portal or courier's web portal, and enter this delivery information into the web portal in order to obtain the status of the delivery. In doing so, transaction server 135 may take a screenshot of the delivery status and insert the screenshot into section 515.

Section 520 may include a screenshot of the checkout page from which the transaction was initiated. This screenshot may display, for example, a description of the product being purchased, the quantity of items being purchased, and the like. Transaction server 135 may obtain this information from merchant server 123.

Section 525 may include a screenshot of the terms and conditions from the merchant's web portal. These terms and conditions may provide the terms of the sale agreed to by the customer at the time of purchase. Section 525 may also display the merchant's privacy policy regarding the disclosure of customer information. Transaction server 135 may obtain this information from merchant server 123.

Transaction server 135 may send the generated representation package 500 to bank 105 or merchant processor 150 via network 115. In some implementations, the representation package may be printed and sent through the postal service or a courier. After the bank 105 or merchant processor 150 has reviewed the representation package, it may render a decision regarding the chargeback. This decision may indicate whether merchant 120 is required to refund the chargeback/transaction amount to customer 140. If, for example, bank 105 or merchant processor 150 decides in favor of merchant 120 (i.e., the merchant prevails or wins), then the merchant may not have to refund the chargeback/transaction amount to customer 140. If, however, bank 105 or merchant processor 150 decides in favor of customer 140 (i.e., the merchant loses), then the merchant may be required to refund the chargeback/transaction amount to the customer. Transaction server 135 may update the downloaded chargeback record in database 137 to indicate whether the chargeback was successfully contested. In some implementations, transaction server 135 may also update the transaction records in merchant server 123 with the decision. In some implementations, merchant 120 may log onto transaction server 135 to view the decision.

Transaction server 135 may generate reports regarding a merchant's chargebacks. These reports may be generated on a merchant-by-merchant basis and may track the number of chargebacks received during a specified period of time. These reports may include a combination of numerical statistics, graphical depictions, and the like. Transaction server 135 may generate these reports on a predetermined schedule or on an on-demand basis.

Figure 6A:
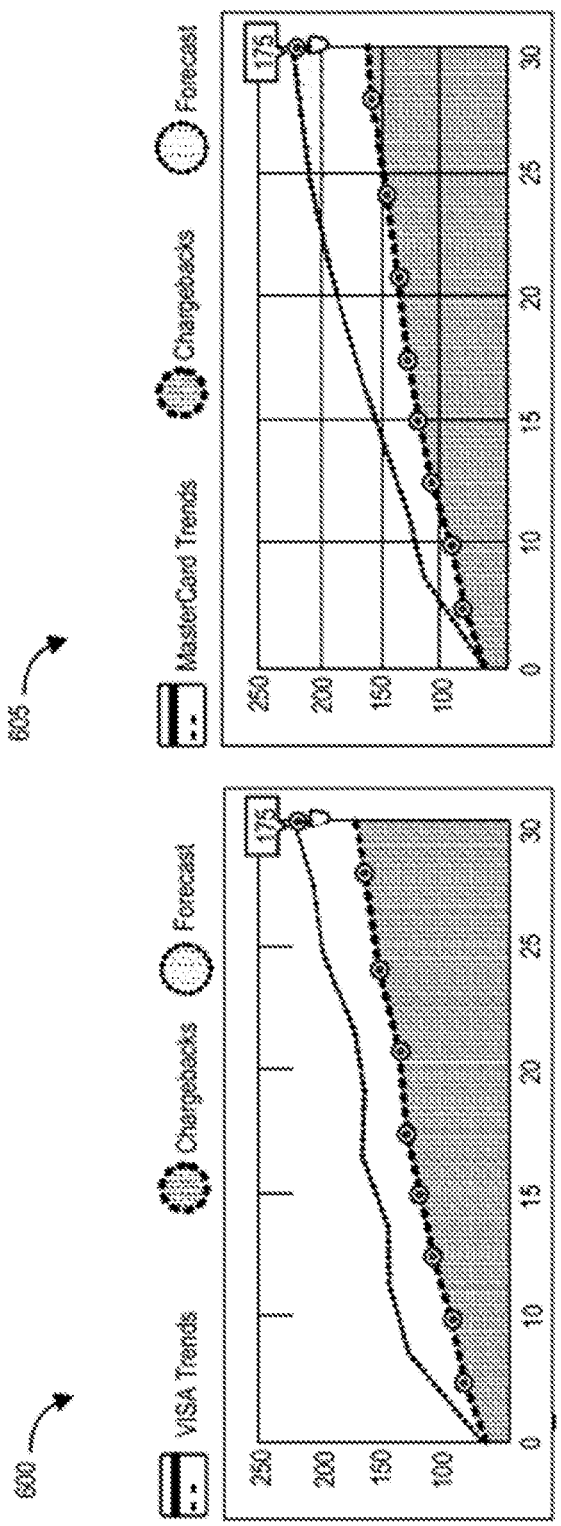
FIGS. 6A, 6B, 6C, and 6D illustrate various reports generated by a transaction server, in accordance with some example implementations.

FIG. 6A illustrates two exemplary graphical reports 600 and 605 for a particular merchant. Graphical reports 600 and 605 may illustrate a distribution of chargebacks for Visa® and MasterCard® accounts, respectively. The horizontal axis in both reports may represent a particular day of the month. The vertical axis in both reports may represent a cumulative chargeback count. For example, on day 10 there may be 100 Visa® chargebacks and 100 MasterCard® chargebacks. In addition to tracking the actual chargeback count, reports 600 and 605 may also forecast the number of expected chargebacks. For example, reports 600 and 605 may forecast that there may be approximately 175 Visa® chargebacks and 175 MasterCard® chargebacks, respectively, by day 30. These forecasts may be based on a various predictive models (e.g., a linear model, a quadratic model, and the like), historical data, and the like. While reports 600 and 605 track the cumulative chargeback count, other parameters, such as a daily chargeback count, may also be monitored. In some implementations, a single graphical report that combines all of these accounts may be generated (e.g., a consolidated report that combines the data from reports 600 and 605).

Figures 6B, 6C:
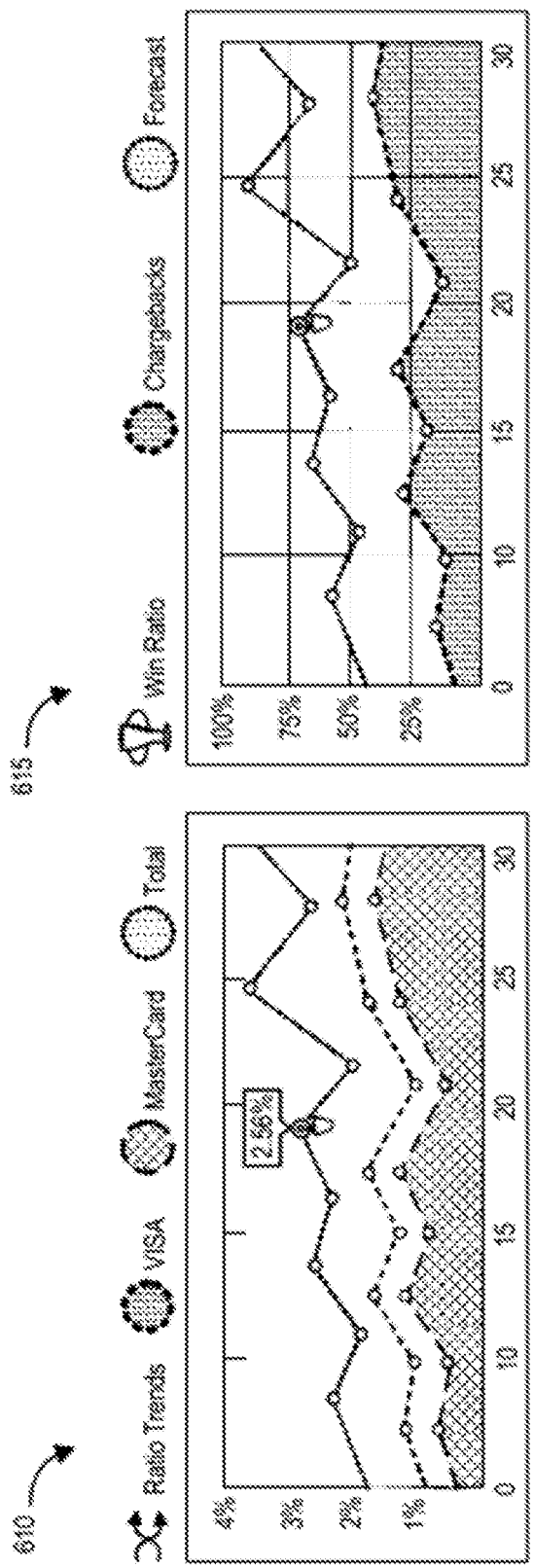

FIG. 6B is another graphical report 610 that illustrates a merchant's chargeback ratio. A chargeback ratio may represent a relationship between a merchant's transaction count and its chargeback count. For example, if every 100 transactions results in 1 chargeback, then the chargeback ratio for the merchant may be 1%. As illustrated in FIG. 6B, each account (i.e., Visa® and MasterCard®) may have a different chargeback ratio. Graphical report 610 may also include a composite total that illustrates the total chargeback ratio for the merchant across all of its accounts.

FIG. 6C is yet another graphical report 615 that illustrates a merchant's win ratio. A win ratio may represent a relationship between the number of chargeback wins for a particular merchant to the merchant's chargeback count. For example, if merchant 120 receives 100 chargebacks during a particular period of time and prevails on 25 of those chargebacks, then the merchant's win ratio is 25% for that period of time. The win ratio may be based on actual chargeback data downloaded from bank 105 or merchant processor 150. Report 615 may also include a forecasted win ratio that may be based on historical performance and new order volumes. Historical performance may include, for example, win ratio statistics from one or more preceding months, win ratio statistics during the same month in one or more preceding years, and the like. New order volumes may also affect the forecasted win ratio. If, for example, merchant 120 receives a large volume of orders during the holiday shopping season, the merchant may expect a large number of chargebacks during the following months. Transaction server 135 may account for these changes in new order volumes by adjusting the forecasted win ratio.

Figure 6D:
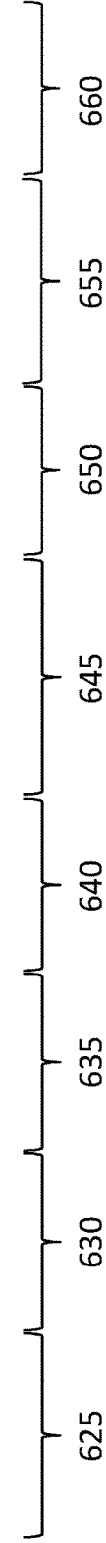

FIG. 6D illustrates another graphical report 620 that provides various statistics regarding a merchant's activities. Merchant 120 may have multiple merchant IDs 625, and each of these merchant IDs may be associated with a particular account alias 630. For example, if merchant 120 has multiple stores or retail websites, each store or retail website may have its own merchant ID 625 and account alias 630. For each merchant ID 625, graphical report 620 may identify the number of Visa® chargebacks 635, the number of MasterCard® chargebacks 640, the total number of chargebacks 645 (e.g., calculated by adding the values in columns 635 and 640), and the number of transactions 650. Graphical report 620 may include a chargeback ratio 655 (e.g., calculated by dividing the value in column 645 by the value in column 650) as described above with respect to FIG. 6B. Graphical report 620 may also include a chargeback dollar ratio 660 which describes a relationship between the amount of money in disputed chargebacks and the total amount of money generated from sales orders. For example, if merchant 120 has $1,000 in sales during a particular period of time and has $100 in chargebacks during the same period of time, then the merchant's chargeback dollar ratio is 10%. In some implementations, the total amount of money generated from sales orders may also be displayed in graphical report 620.

Reports may be customized to track any desired parameter or data value. For example, transaction server 135 may generate a reason code report that analyzes which reason codes are most frequently cited by customers. Merchant 120 may use the reason code report to better understand why customers are returning items. Reason codes can be extracted from the chargeback records obtained from bank server 107 or merchant processor server 155. Transaction server 135 may tailor the reason code reports to focus on returns of specific products, returns initiated by specific customers and/or credit card numbers, returns initiated at specific banks, and the like.

In some implementations, transaction server 135 may have an alert system. These alerts may relate to various conditions involving the merchant's chargebacks, their accounts, and the like. When any of these conditions are satisfied, transaction server 135 may send an alert to the merchant indicating the same. For example, a bank may levy a financial penalty on a merchant or shut the merchant account down if the merchant's chargeback count exceeds a predetermined value during the month. In order to monitor the number of chargebacks attributed to the merchant, the merchant may create an alert that notifies the merchant when this predetermined value has been reached.

Figure 7A:
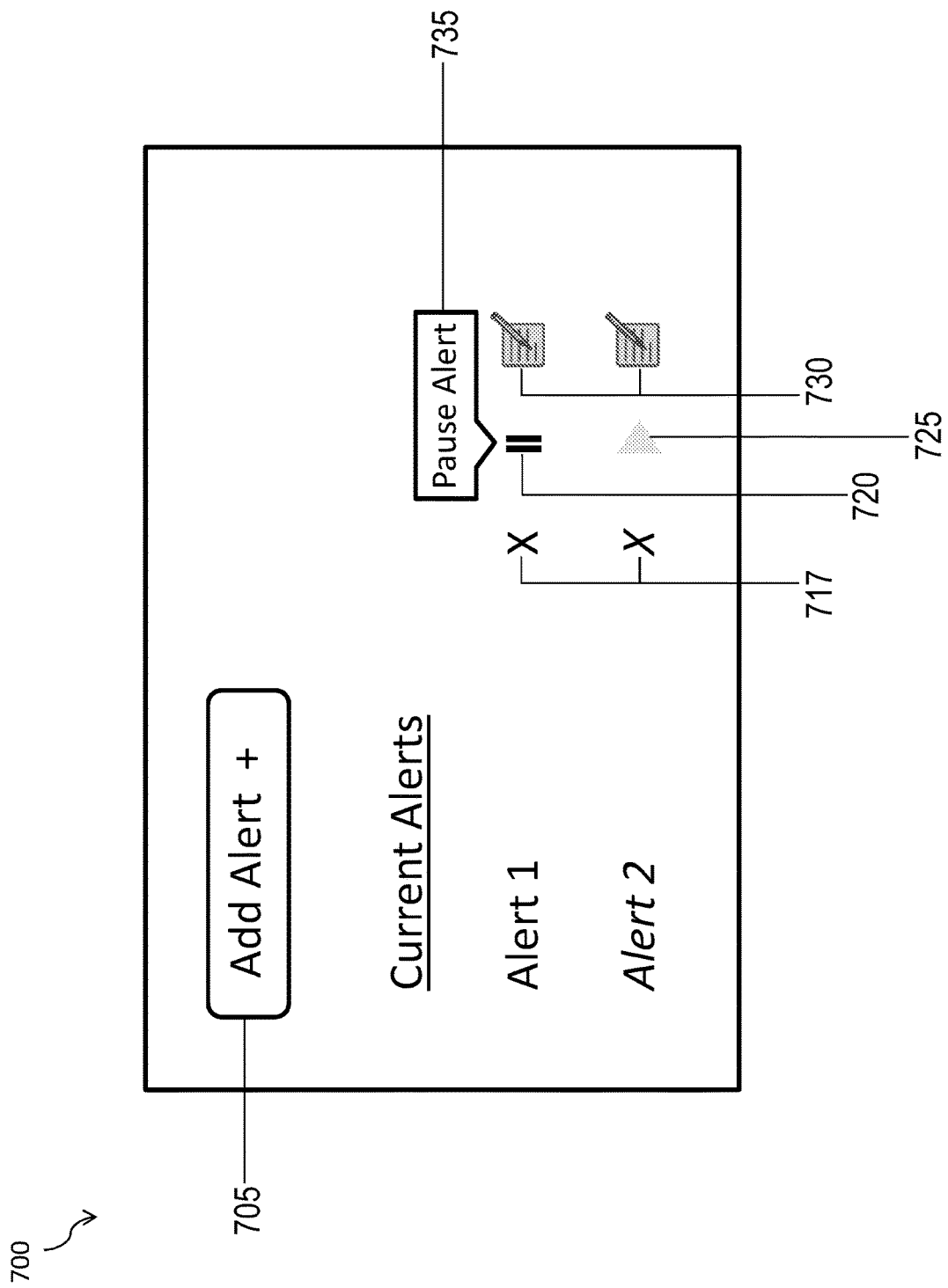
FIG. 7A illustrates a user interface for managing merchant alerts, in accordance with some example implementations.

A merchant (such as merchant 120) may utilize user interface 700 to create and manage alerts. Merchant 120 may access user interface 700 by logging onto transaction server 135 via network 115. In the implementation of FIG. 7A, merchant 120 may have, for example, two alerts. Each alert may be associated with a variety of control buttons. Merchant 120 may delete alert 1 (by selecting button 717), pause alert 1 or otherwise prevent alert 1 from monitoring its condition (by selecting button 720), or edit alert 1 (by selecting button 730). Similarly, merchant 120 may delete alert 2 (by selecting button 717), resume operation of alert 2 (by selecting button 725), or edit alert 2 (by selecting button 730). User interface 700 may display paused alerts, such as alert 2, in a visually different manner than active alerts, such as alert 1. In the implementation of FIG. 7A, for example, paused alert 2 may be grayed out. In some implementations, user interface 700 may display a tooltip that describes the functionality associated with the button. In the implementation of FIG. 7A, for example, user interface 700 may display a "Pause Alert" tooltip 735 when merchant 120 hovers or mouses over button 720. Merchant 120 may add an alert by selecting button 705.

Figure 7B:
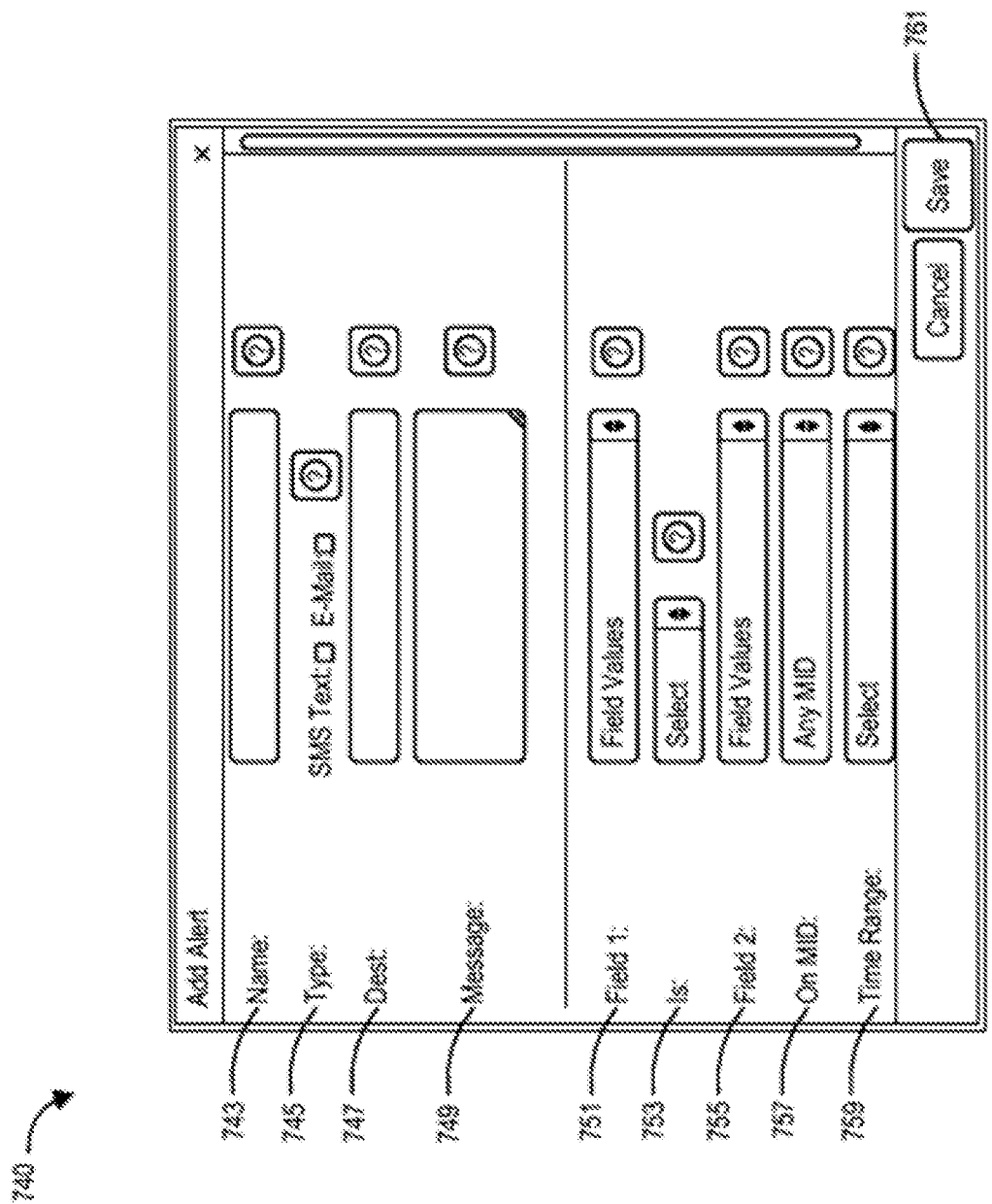
FIG. 7B illustrates a user interface for creating merchant alerts, in accordance with some example implementations.

Upon selecting button 705 or edit buttons 730, transaction server 135 may cause user interface 740 as illustrated in FIG. 7B to be displayed to merchant 120. Merchant 120 may utilize user interface 740 to create or edit customized alerts. These alerts may be stored at transaction server 135 and/or database 137. Merchant 120 may specify an alert name 743 and the type of alert 745 to be sent. The alert may be an SMS text message or an e-mail. In some implementations, the alert may be an automatically generated voicemail message, for example. Transaction server 135 may send the alert to destination 747 which may be the merchant's phone number or e-mail address. The alert may include a message 749 that describes the condition being monitored. For example, if the alert monitors the number of chargebacks accumulated in a month, the message may display the threshold chargeback count and the merchant's current number of chargebacks.

The merchant may specify the conditions associated with the alert by designating a first field variable in field 751, a Boolean operator in field 753, and a second field variable in field 755.

The first and second field variables entered in fields 751 and 755, respectively, may be, for example, the total number of transactions, the total dollar amount of transactions, the total number of Visa® transactions, the total number of MasterCard® transactions, the total dollar amount of Visa® transactions, the total dollar amount of MasterCard® transactions, the total number of chargebacks, the total dollar amount of chargebacks, the total number of Visa® chargebacks, the total number of MasterCard® chargebacks, the total dollar amount of Visa® chargebacks, the total dollar amount of MasterCard® chargebacks, and the like. In some implementations, the second field variable entered at 755 may be a quantity or number.

The Boolean operator entered in field 753 may specify the relationship required between the first field variable 751 and the second field variable 755. For example, if merchant 120 enters "equals" or "=" in field 730, then the alert condition may be satisfied when the first field variable 751 is equal to the second field variable 755. Other Boolean operators may be used including, for example "does not equal" or "!=", "greater than" or ">", "less than" or "<", "greater than or equal to" or ">=", "less than or equal to" or "<=", "% or more" to indicate that the first field variable must be a particular percentage higher than the second field variable, and the like.

Merchant 120 may impose additional restrictions on the alert condition by specifying a merchant ID (MID) at field 757 and a time range at field 759. The time range may be, for example, a month-to-date designation, 30 days, 60 days, 90 days, and the like. Merchant 120 can add the alert by selecting "Save" button 761.

As an example, a merchant may add an alert that notifies the merchant if his/her chargeback count (first field variable at 751) is greater than (Boolean operator at 753) his/her transaction count (second field variable at 755) on any merchant ID (field 757) during the last 30 days (field 759). When this condition is satisfied, transaction server 135 may send an alert, such as an SMS text message or an e-mail, to the designated destination (field 747). The alert may include a message 749 indicating, for example, that "Your chargeback count is greater than your transaction account across all MIDs during the last 30 days."

FIG. 8 illustrates a process 800 for downloading a merchant's chargeback records.

At 810, transaction server 135 may execute a script to retrieve chargeback records. These chargeback records may be retrieved from web portals of financial institutions (such as bank 105 or merchant processor 150) at which the merchant (such as merchant 120) has an account. The chargeback record may represent a refund, a request for more information, or reversal of funds to a purchaser (such as customer 140) by the financial institution.

At 820, the script may direct transaction server 135 to navigate a web browser to a web portal associated with the financial institution. In some implementations, the web portal may be a webpage or homepage of a bank located at a particular URL. Transaction server 135 may find this URL from merchant profile 300.

At 830, transaction server 135 may provide authentication information to the bank's web portal in order to access the merchant's account. The authentication information may include, for example, the merchant's username and password. Transaction server 135 may obtain this authentication information from merchant profile 300.

At 840, transaction server 135 may access the merchant's chargeback records. In some implementations, transaction server 135 may select one or more chargeback filters in order to refine the results returned by bank server 107. Transaction server 135 may select the desired chargeback filters using user interface 360. These chargeback filters may include, for example, a transaction date, a credit card number, a credit card type, a merchant ID, a transaction/chargeback amount, a chargeback reference number, and the like.

At 850, transaction server 135 may download the chargeback records to database 137. These chargeback records may be downloaded as a CSV file or as file for a spreadsheet application.

Figure 9:
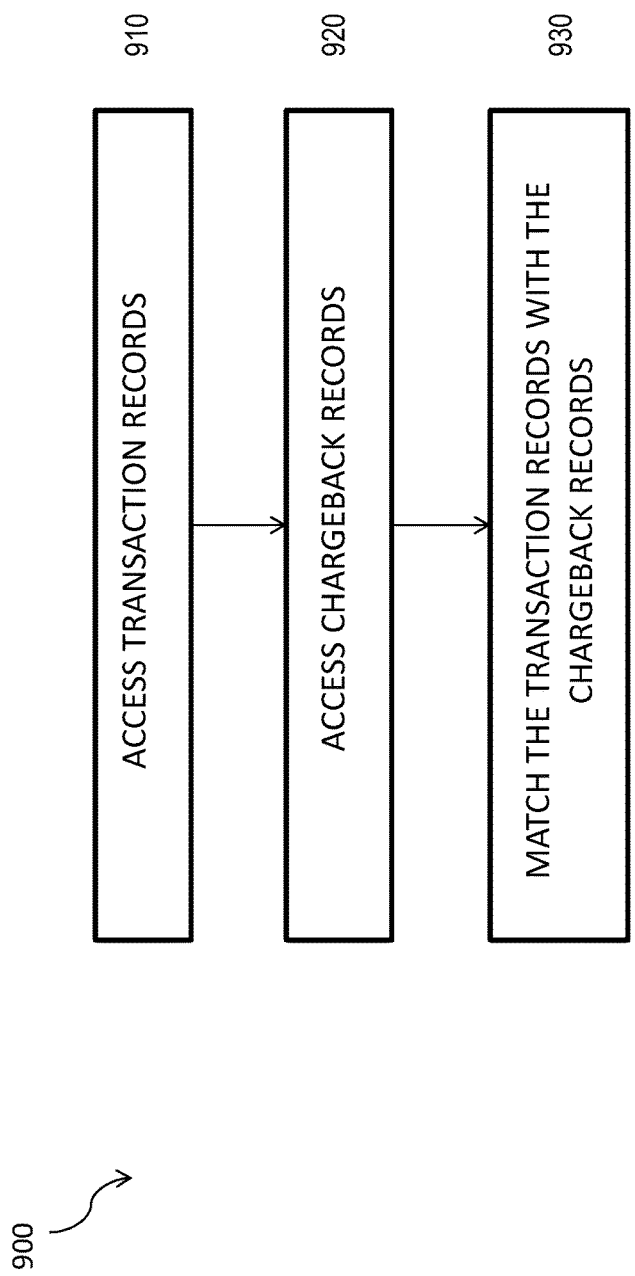
FIG. 9 illustrates a process for matching transaction records with chargeback records, in accordance with some example implementations.

FIG. 9 illustrates a process 900 for matching transaction records with chargeback records.

At 910, transaction server 135 may access transaction records. These transaction records may have one or more transaction data values representative of one or more purchases from the merchant. These data values may include, for example, a purchase order number, a merchant identifier, the credit card number and credit card type used for the purchase, a transaction amount, a transaction date, and the like. These transaction records may be stored at merchant server 123.

At 920, transaction server 135 may access chargeback records associated with the merchant. The chargeback records may include chargeback data values representing a return of funds to a purchaser or a request for more information regarding the transaction. FIG. 3E illustrates exemplary chargeback records 383 and 385 which may be retrieved from bank 105.

At 930, transaction server 135 may match the transaction records with the chargeback records using the transaction data values and the chargeback data values. In some implementations, the chargeback data values may include mandatory data values. These mandatory data values may include a merchant ID, a credit card type, a credit card number, a transaction/chargeback amount, and a transaction date. An exact match may be found if all of the mandatory data values have a matching transaction data value as explained above with respect to FIG. 4A.

Figure 10:
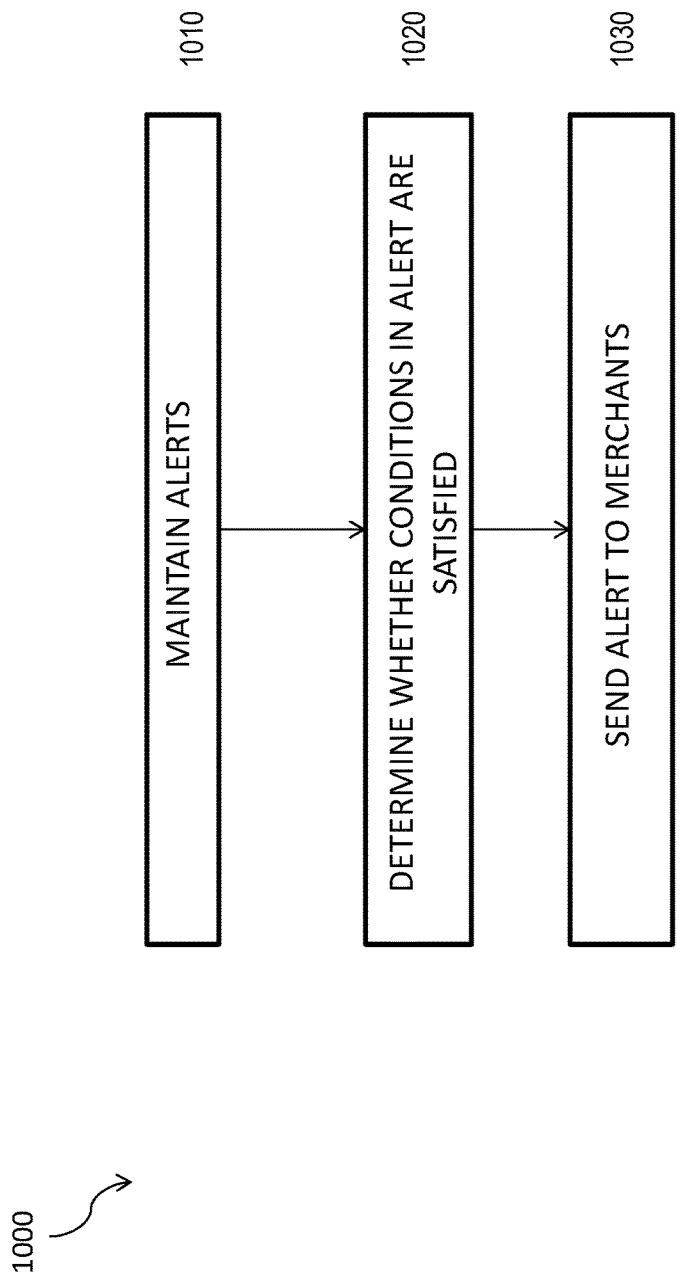
FIG. 10 illustrates a process for sending an alert to a merchant, in accordance with some example implementations.
Figure 11:
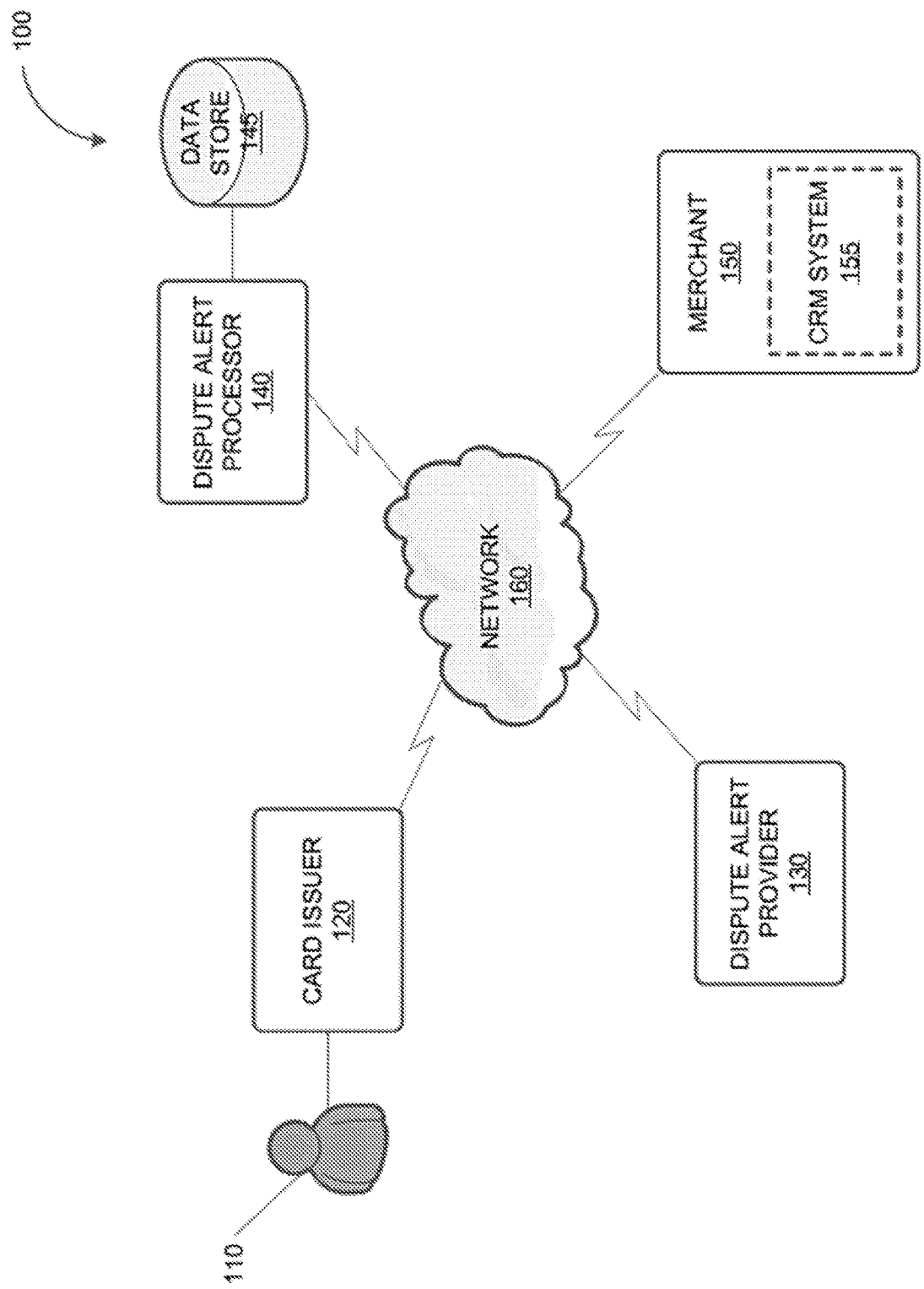
FIG. 11 depicts a block diagram illustrating a network environment for processing dispute alerts, in accordance with some example embodiments.
Figure 12:
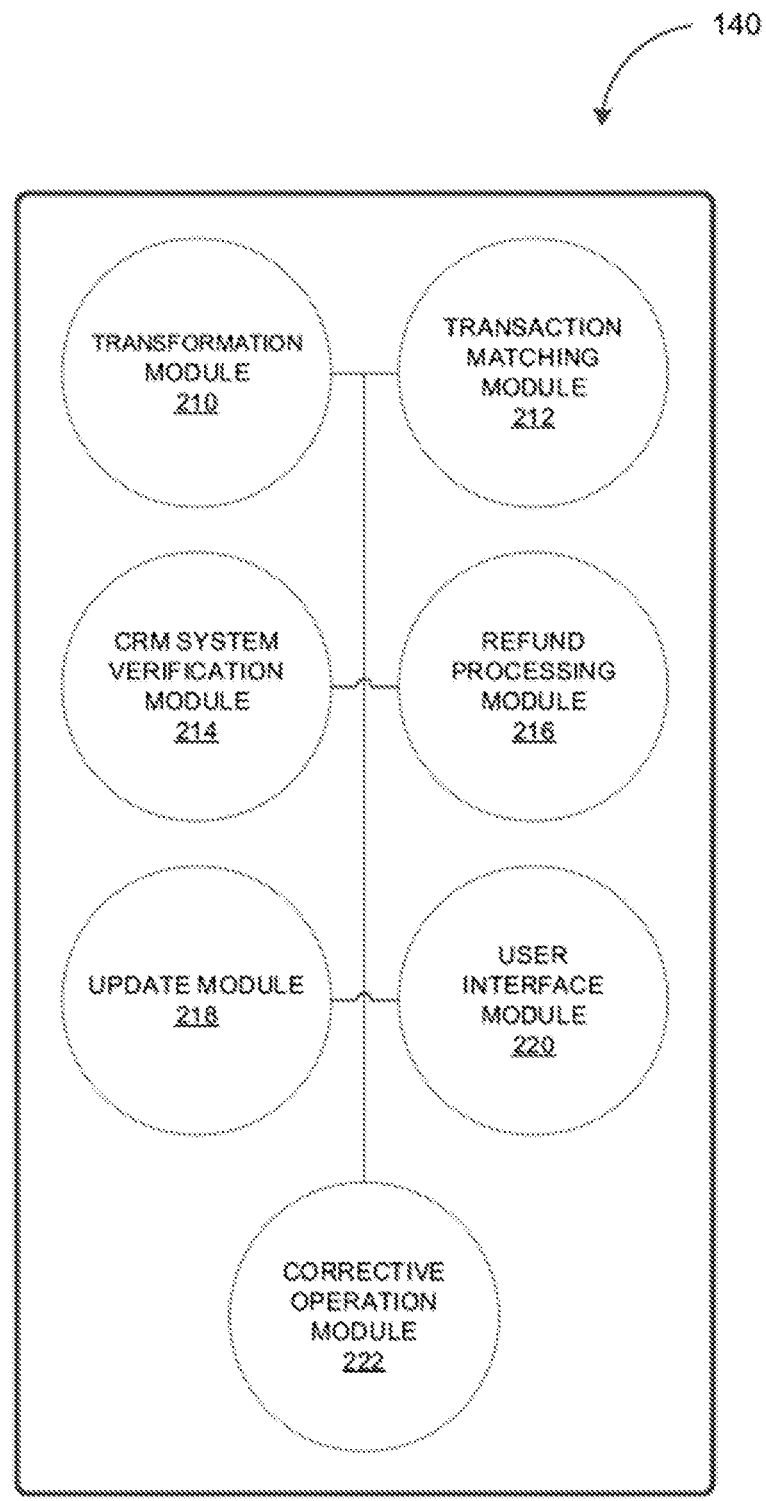
FIG. 12 depicts a block diagram illustrating a dispute alert processor, in accordance with some example embodiments.
Figure 13:
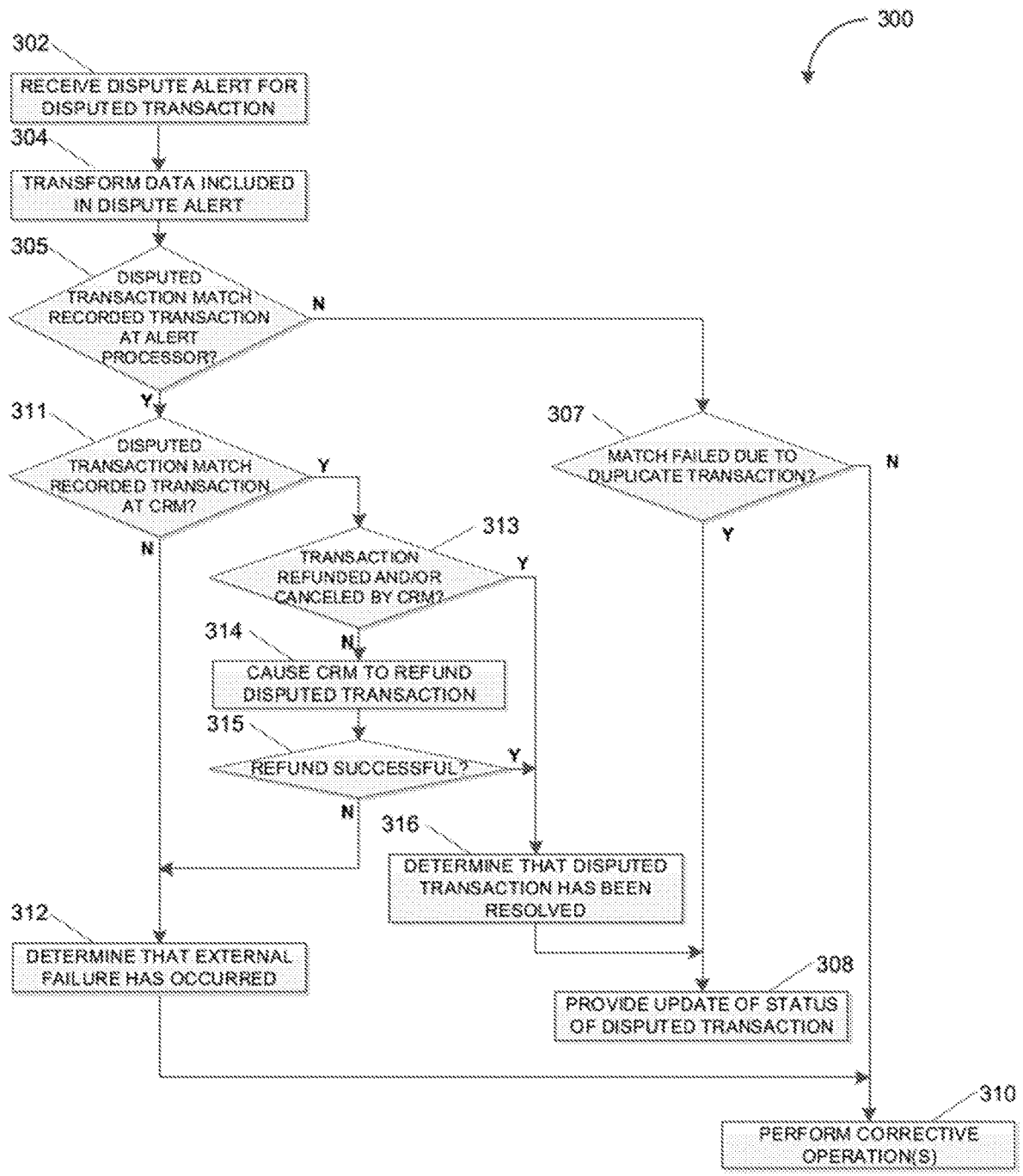
FIG. 13 depicts a flowchart illustrating a process for processing one or more dispute alerts, in accordance with some example embodiments.
Figure 14:
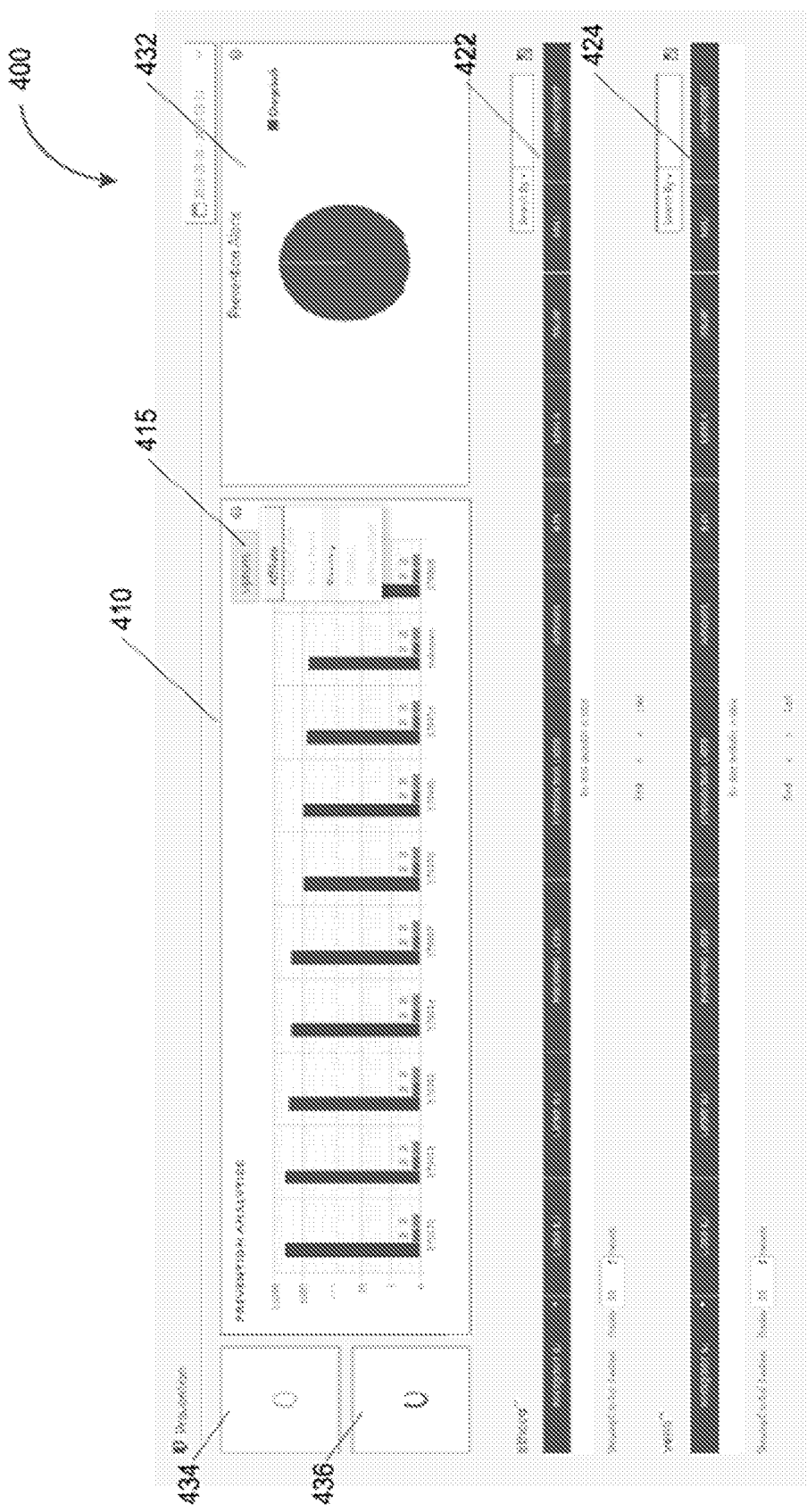
FIG. 14 depicts a graphic user interface, in accordance with some example embodiments.
Figure 15:
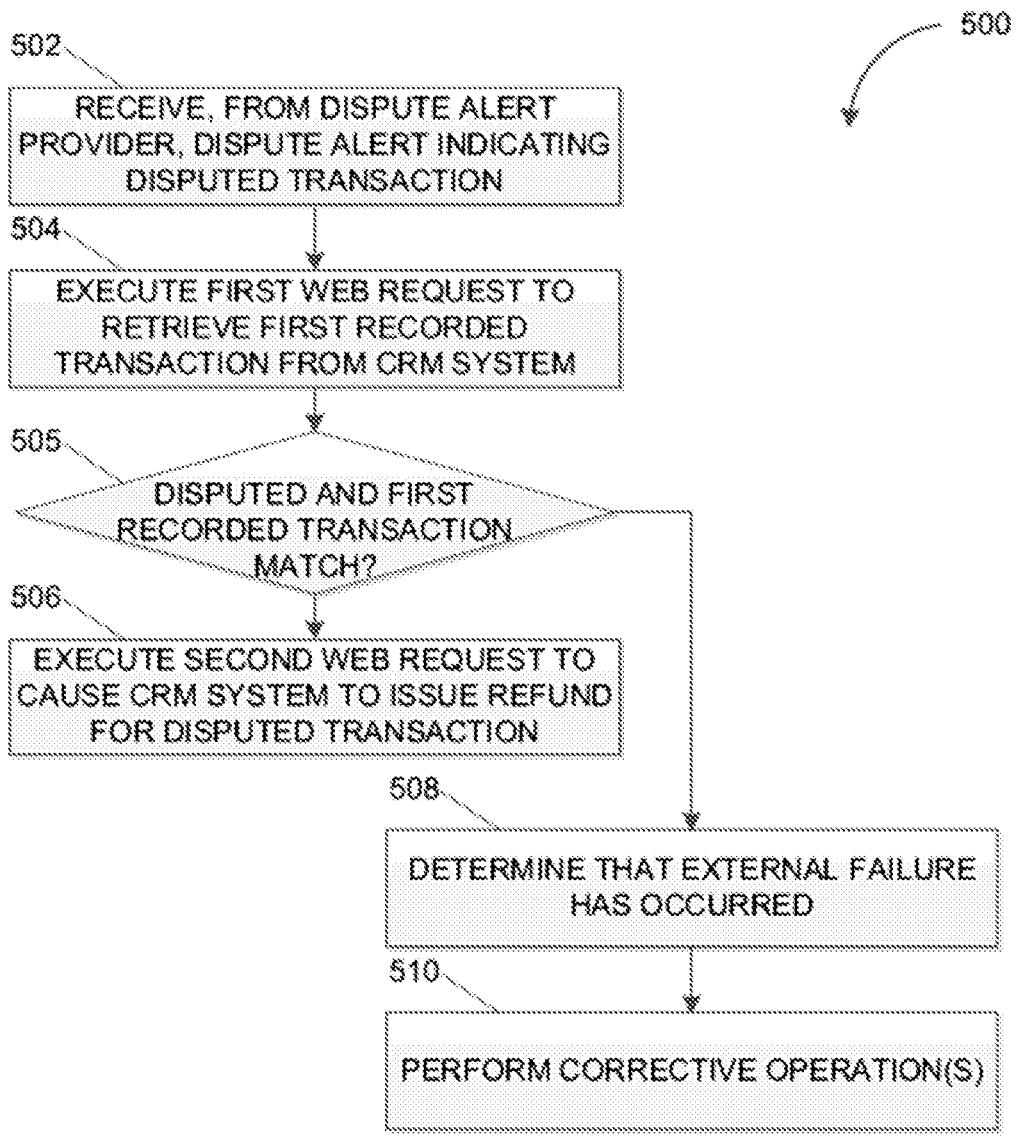
FIG. 15 depicts a flowchart illustrating a process for processing one or more dispute alerts, in accordance with some example embodiments.

FIG. 10 illustrates a process 1000 for sending an alert to a merchant.

At 1010, transaction server 135 may maintain alerts. These alerts may have one or more conditions relating to chargebacks. A merchant may manage or create a customized alert using user interfaces 700 and 740. The alert may include a condition based on a first field variable 751, a Boolean operator 753, and a second field variable 755 as described above with respect to user interface 740.

At 1020, transaction server 135 may determine whether the conditions in the alert are satisfied.

At 1030, transaction server 135 may send an alert to a merchant. The alert may be sent to a phone number via an SMS text message or to an e-mail address via an e-mail message. In some implementations, the alert may include a message describing the alert.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

A dispute alert may be triggered when a cardholder disputes a transaction. For example, in response to a disputed transaction by a cardholder, a card issuing bank and/or a third party dispute alert provider may notify the merchant affected by the disputed transaction. As such, the merchant may be given an opportunity to resolve the disputed transaction (e.g., by providing a refund to the cardholder) without triggering the conventional chargeback process noted above. However, it may still be incumbent upon the merchant to investigate the legitimacy of the disputed transaction.

In some example embodiments, a dispute alert processor can respond to dispute alerts from the card issuing bank and/or the dispute alert provider. For instance, the dispute alert processor can respond to a dispute alert by verifying the disputed transaction. According to some example embodiments, the dispute alert processor may store at least a portion of a merchant's recorded transactions (e.g., orders). Thus, to verify a disputed transaction, the dispute alert processor may attempt to locate a matching transaction amongst the recorded transactions stored at dispute alert processor. In addition, the dispute alert processor further verifies the disputed transaction by attempting to locate a matching transaction amongst the recorded transactions stored by the merchant's customer relationship management system.

In some example embodiments, the disputed and the recorded transaction may both be associated with a plurality of transaction descriptors (e.g., transaction date, amount, type). As such, the dispute alert processor may identify matching transaction descriptors between the disputed transaction and the recorded transaction. Moreover, different transaction descriptors may be assigned different weights to reflect, for example, the importance and/or priority of matching each transaction descriptor. For instance, more specific transaction descriptors such as the credit card information associated with a transaction may be assigned a higher weight than more common transaction descriptors such as the date and amount of a transaction. The dispute alert processor may determine a weighted sum of the matching transaction descriptors between a disputed transaction and a recorded transaction. The dispute alert processor can determine that a disputed transaction matches a recorded transaction when the weighted sum exceeds a threshold.

In some example embodiments, when the dispute alert processor is able to verify a disputed transaction (e.g., by locating a matching transaction at the dispute alert processor and at a merchant's customer relationship management system), the dispute alert processor may be configured to resolve the disputed transaction by at least providing a refund (e.g., to a cardholder). For instance, the dispute alert processor may cause the merchant's customer relationship management system to issue the refund. As such, the dispute alert processor may resolve the disputed transaction without triggering the conventional chargeback process. Moreover, the dispute alert processor may resolve the disputed transaction automatically and in a manner that is transparent to the affected merchant.

In some example embodiments, the dispute alert processor may be configured to provide, via a graphic user interface, data associated with at least a portion of a merchant's dispute alerts. For example, the dispute alert processor may provide, via the graphic user interface, data related to individual disputed transactions and/or groups of disputed transactions (e.g., from a specified time period). The dispute alert processor may further provide, via the graphic user interface, data for disputed transactions that have been sorted based on one or more transaction descriptors associated with the disputed transactions including, for example, an originating dispute alert provider, country, bank, price point, and/or product.

FIG. 1 depicts a block diagram illustrating a network environment 100 for processing dispute alerts, in accordance with some example embodiments. Referring to FIG. 1, a card issuer 120, a dispute alert provider 130, a dispute alert processor 140, and a merchant 150 may be communicatively coupled via a wired and/or wireless network 160. The network 160 may include, for example, a wide area network, a local area network, and/or the Internet.

As shown in FIG. 1, a user 110 may dispute a transaction with the card issuer 120. For example, the user 110 may dispute the transaction by contacting the card issuer 120 (e.g., by Internet, mail, facsimile, electronic mail, in person, short messaging service text, telephone).

In some example embodiments, the card issuer 120 may notify (e.g., via the network 160) the dispute alert provider 130 of the disputed transaction. The dispute notification from the card issuer 120 may include data describing the disputed transaction including, for example, merchant, timestamp, amount, payment card number, and type of transaction. According to some example embodiments, the card issuer 120 may notify the dispute alert provider 130 of the disputed transaction instead of initiating a conventional chargeback process.

In some example embodiments, in response to the dispute notification from the card issuer 120, the dispute alert provider 130 may transmit a dispute alert to the dispute alert processor 140. The dispute alert may be transmitted to the dispute alert processor 140 instead of the merchant 150 for further handling. According to some example embodiments, the dispute alert provider 130 may push the dispute alert to the dispute alert processor 140 using one or more web service requests (e.g., Hypertext Transfer Protocol POST requests). The dispute alert may be further provided via an encrypted link (e.g., Secure Socket Layer).

In some example embodiments, the dispute alert processor 140 may receive a dispute alert (e.g., from the dispute alert provider 130) and transform the data included in the dispute alert for further handling and storage by the dispute alert processor 140. The dispute alert may include a plurality of transaction descriptors that characterize a disputed transaction. As such, the dispute alert processor 140 may execute one or more scripts (e.g., in PHP: Hypertext Preprocessor) to standardize and scrub the data to, for example, change and remove incorrect, incomplete, improperly formatted, and/or duplicate transaction descriptors.

In some example embodiments, the dispute alert processor 140 may verify the disputed transaction based at least in part on the transaction descriptors included in the dispute alert. For example, the dispute alert processor 140 may attempt to match the disputed transaction with at least one of the recorded transactions associated with the merchant 150. The dispute alert processor 140 may attempt to locate at least one matching transactions amongst the recorded transactions stored by the dispute alert processor 140 (e.g., at a data store 145). According to some example embodiments, the dispute alert processor 140 can include an open application programing interface server (not shown) that is configured to receive recorded transactions pushed from a merchant (e.g., the customer relationship management system 155). Alternately or additionally, the dispute alert processor 140 can perform (e.g., automatically) data pull operations to obtain recorded transactions from the merchant. These data pull operations can access the merchant's third party application programming interface.

According to some example embodiments, when the dispute alert processor 140 is unable to locate a matching recorded transaction, the dispute alert processor 140 may automatically perform one or more corrective operations (e.g., updates) and reprocess the disputed transaction (e.g., by again attempting to locate a matching recorded transaction). This automated process may be performed periodically (e.g., every 15 minutes) and/or upon completion of the corrective operations. By contrast, if the dispute alert processor 140 is able to locate a matching recorded transaction, the dispute alert processor 140 may further verify the disputed transaction with the customer relationship management system 155 of the merchant 150. For instance, the dispute alert processor 140 may verify the disputed transaction by attempting to locate a matching recorded transaction at the customer relationship management system 155.

In some example embodiments, to determine a match between the disputed transaction and one or more recorded transactions, the dispute alert processor 140 may compare transaction descriptors characterizing the disputed transaction and transaction descriptors characterizing one or more recorded transactions. Each transaction descriptor may be associated with a weight that reflects, for example, an importance and/or priority of matching that particular transaction descriptor. Accordingly, the dispute alert processor 140 may determine a weighted sum of the matching transaction descriptors between the disputed transaction and a recorded transaction. A disputed transaction may be determined to match a recorded transaction when the weighted sum of the matching transaction descriptors exceeds a threshold.

In some example embodiments, if the dispute alert processor 140 is able to verify the disputed transaction (e.g., by locating a recorded transaction that matches the disputed transaction at the dispute alert processor 140 and the customer relationship management system 155), the dispute alert processor 140 may provide a refund to the user 110. For example, the dispute alert processor 140 may provide the refund by causing the customer relationship management system 155 to issue a refund to the user 110.

In some example embodiments, the dispute alert processor 140 may store a status of a plurality of disputed transaction (e.g., in the data store 145). As such, the dispute alert processor 140 may update the stored status of a disputed transaction when the dispute alert processor 140 is able to verify the disputed transaction and provide a refund (e.g., to the user 110). The dispute alert processor 140 may also update the stored status of a disputed transaction when the dispute alert processor 140 is unable to resolve a disputed transaction (e.g., failed verification and/or refund). For example, the dispute alert processor 140 may update the status of the disputed transaction to indicate whether the disputed transaction has been resolved. Alternately or additionally, the dispute alert processor 140 may provide an update of the status of a disputed transaction to the dispute alert provider 130, the card issuer 120, and/or the merchant 150.

Although FIG. 1 depicts a single card issuer (e.g., the card issuer 120), dispute alert provider (e.g., the dispute alert provider 130), and merchant (e.g., the merchant 150), the network environment 100 can include additional card issuers, alert providers, and/or merchants communicatively coupled with the dispute alert processor 140 without departing from the scope of the present disclosure.

FIG. 2 depicts a block diagram illustrating the dispute alert processor 140, in accordance with some example embodiments. The dispute alert processor 140 may include at least one processor, such as a computer, a server, a tablet, smartphone, and/or the like, and at least one memory including program code to provide one or more functions, such as modules. In some example embodiments, the dispute alert processor 140 including the modules may be implemented on separate processors coupled by a link, a bus, a network, and/or the like. In some example embodiments, the dispute alert processor 140 including the modules may be implemented at a cloud based server.

Referring to FIGS. 1-2, the dispute alert processor 140 may include a transformation module 210, transaction matching module 212, a customer relationship management system verification module 214, a refund processing module 216, an update module 218, a user interface module 220, and a corrective operation module 222.

In some example embodiments, the transformation module 210 may be configured to receive a dispute alert (e.g., from the dispute alert provider 130 and/or the card issuer 120) for a disputed transaction and transform the data included in the dispute alert into a standardized format for further processing and/or storage. The dispute alert may include a plurality of transaction descriptors characterizing various aspects of the disputed transaction including, for example, issuer name (e.g., of the card issuer 120), source, fraud type, alert date and time, match timestamp, merchant descriptor (e.g., name and/or identifier), card number, transaction date and time, amount, currency, transaction type, outcome, stop status, refund status, date and time flagged as fraud, alert age (e.g., hours), chargeback initiator (e.g., the user 110), merchant category classification, date and time of outcome update, outcome updated by, comments, acquirer reference number, alert type, chargeback amount, chargeback currency, chargeback reason code, and transaction identifier. The transformation module 210 may perform transformations that includes, for example, standardizing and scrubbing (e.g., change and remove incorrect, incomplete, improperly formatted, and/or duplicate transaction descriptors) the data included in the dispute alert into a standardized format for further processing and/or storage. According to some example embodiments, data included in the dispute alert may be transformed prior to additional handling and/or storage by the dispute alert processor 140.

The transaction matching module 212 may attempt to locate one or more recorded transactions stored by the dispute alert processor 140 (e.g., in the data store 145) that match the disputed transaction. For example, the transaction matching module 212 may compare transaction descriptors characterizing the disputed transaction against transaction descriptors characterizing each of a plurality of recorded transactions. According to some example embodiments, to determine whether a disputed transaction matches a recorded transaction, the transaction matching module 212 may generate a weighted sum S of an n number matching transaction descriptors (e.g., $d_1, d_2, \ldots d_n$) between the disputed transaction and the recorded transaction. The weighted sum S may be determined as follows:

$$S = \sum_{i=1}^{n} w_i d_i = w_1 d_1 + w_2 d_2 + \ldots + w_n d_n,$$

wherein $w_i$ may be the weight associated with a corresponding transaction descriptor $d_i$.

For instance, a disputed transaction and a recorded transaction may have a plurality of matching transaction descriptors including, for example, a same merchant, card number, transaction date and time, and currency. Each transaction descriptor may be assigned a weight that reflects, for example, an importance and/or priority of matching that particular transaction descriptor. Thus, the weighted sum of the matching transaction descriptors may be a sum of the respective weights assigned to, for example, the merchant transaction descriptor, the card number transaction descriptor, the transaction date and time transaction descriptor, and the currency transaction descriptor. The transaction matching module 212 may determine that the disputed transaction match the recorded transaction when the weighted sum of matching transaction descriptors exceeds a threshold.

In some example embodiments, the customer relationship management system verification module 214 may attempt to locate one or more recorded transactions that match a disputed transaction. For example, the customer relationship management system verification module 214 may determine one or more weighted sums of matching transaction descriptors between the disputed transaction and a recorded transaction. The customer relationship management system verification module 214 may attempt to locate matching recorded transactions amongst the recorded transactions stored by one or more customer relationship management systems (e.g., the customer relationship management system 155 of the merchant 150). For instance, the customer relationship management system verification module 214 may interact with the customer relationship management system 155 at least by executing one or more scripts (e.g., in PHP: Hypertext Preprocessor) that calls a plurality of web service requests (e.g., Hypertext Transfer Protocol GET, POST, and/or PUT requests) to retrieve recorded transactions from the customer relationship management system 155. The customer relationship management system verification module 214 may determine whether the information for the disputed transaction (e.g., transaction descriptors) retrieved from the customer relationship management system 155 matches the information for the disputed transaction stored at the dispute alert processor 140.

According to some example embodiments, the customer relationship management system verification module 214 may provide additional verification for a disputed transaction that is already matched to a recorded transaction by the transaction matching module 212. For example, the customer relationship management module 214 may attempt to locate matching recorded transactions at a customer relationship management system (e.g., the customer relationship management system 155) after the transaction matching module 212 locates a matching recorded transaction amongst the recorded transactions stored at by the dispute alert processor 140 (e.g., at the data store 145).

In some example embodiments, the refund processing module 216 may be configured to provide a refund (e.g., to the user 110) when the dispute alert processor 140 (e.g., the transaction matching module 212 and/or the customer relationship management system verification module 214) is able to verify a disputed transaction. For example, the refund processing module 216 may execute one or more scripts (e.g., in PHP: Hypertext Preprocessor) that calls a plurality of web service requests (e.g., Hypertext Transfer Protocol GET, POST, and/or PUT requests) to cause a customer relationship management system (e.g., the customer relationship management system 155 of the merchant 150) to issue a refund (e.g., to the user 110).

In some example embodiments, the update module 218 may be configured to update a status of a disputed transaction to indicate whether the disputed transaction was successfully resolved (e.g., verified, refunded). The update module 218 may be configured to update the status of the disputed transaction stored at the dispute alert processor 140 (e.g., at the data store 145). For example, the data store 145 may be a Structured Query Language (SQL) based relational database. As such, the update module 218 may execute one or more scripts (e.g., in PHP: Hypertext Preprocessor) that calls one or more Structure Query Language operations (e.g., insert, update, delete) to update the status of the disputed transaction stored in the data store 145. In addition, the update module 218 may also provide an update of the status of a disputed transaction to a corresponding card issuer (e.g., the card issuer 120), dispute alert provider (e.g., the dispute alert provider 130), and/or merchant (e.g., the merchant 150). For instance, the update module 218 may execute one or more web service requests (e.g., Hypertext Transfer Protocol POST) to provide the status updates. Moreover, the update module 218 may provide the updates via an encrypted link (e.g., Secure Socket Layer).

The user interface module 220 may be configured to provide, to an affected merchant (e.g., the merchant 150), data corresponding to a specific disputed transaction and/or groups of disputed transactions. In some example embodiments, the user interface module 220 may provide, via a graphic user interface, data for disputed transactions that have been sorted based on one or more transaction descriptors associated with the transactions (e.g., an originating dispute alert provider, country, bank, price point, and/or product).

In some example embodiments, the corrective operation module 222 may be configured to perform one or more corrective operations in response to a failure by the transaction matching module 212 to match a disputed transaction with at least one recorded transaction stored at the dispute alert processor 140. The corrective operation module 222 may also perform one or more corrective operations when the customer relationship management system module 214 is unable to match the disputed transaction with one or more recorded transactions stored by a customer relationship management system (e.g., the customer relationship management system 155). In addition, the corrective operation module 222 may perform one or more corrective operations in response to external failures including, for example, a failure by a customer relationship management system (e.g., the customer relationship management system 155) to issue a refund.

In some example embodiments, a disputed transaction may fail to match at least one recorded transaction when a merchant descriptor (or permutations thereof) associated with the disputed transaction fails to match the merchant descriptor of any recorded transactions. As such, the corrective operation module 222 can be configured to update its library of merchant descriptors while the disputed transaction may be reprocessed (e.g., automatically) with the new merchant descriptors. Alternately or additionally, the corrective operation module 222 can respond external failures by updating application programming interface access credentials (e.g., to the customer relationship management system 155) and internet protocol white lists.

FIG. 3 depicts a flowchart illustrating a process 300 for processing one or more dispute alerts. Referring to FIGS. 1-3, the process 300 may be performed by the dispute alert processor 140.

The dispute alert processor 140 may receive, from a dispute alert provider, a dispute alert for a disputed transaction (302). For example, the dispute alert processor 140 may receive a dispute alert pushed (e.g., using one or more web service requests) from the dispute alert provider 130 and/or the card issuer 120. The dispute alert may include a plurality of transaction descriptors characterizing various aspects of the disputed transaction including, for example, transaction descriptors that indicate when and where the disputed transaction was executed, the current status of the disputed transaction, and an amount of the disputed transaction. Specifically, the plurality of transaction descriptor may include, for example, an issuer name (e.g., of the card issuer 120), source, fraud type, alert date and time, match timestamp, merchant descriptor (e.g., name and/or identifier), card number, transaction date and time, amount, currency, transaction type, outcome, stop status, refund status, date and time flagged as fraud, alert age (e.g., hours), chargeback initiator (e.g., the user 110), merchant category classification, date and time of outcome update, outcome updated by, comments, acquirer reference number, alert type, chargeback amount, chargeback currency, chargeback reason code, and transaction identifier.

The dispute alert processor 140 may transform the data included in the dispute alert (304). For example, the dispute alert processor 140 may transform the data included in the dispute alert to change and remove incorrect, incomplete, improperly formatted, and/or duplicate transaction descriptors.

The dispute alert processor 140 may determine whether the disputed transaction matches at least one recorded transaction stored by the dispute alert processor 140 (305). In some example embodiments, the dispute alert processor 140 may store, in a Structured Query Language based relational database (e.g., the data store 145), at least a portion of the recorded transactions from the merchant 150. As such, the dispute alert processor 140 may execute one or more Structured Query Language operations to locate and retrieve recorded transactions stored by the dispute alert processor 140 in the Structured Query Language based relational database (e.g., the data store 145).

In some example embodiments, the dispute alert processor 140 may generate a weighted sum of matching transaction descriptors between the disputed transaction and the recorded transactions. For example, the disputed transaction and a recorded transaction may share a plurality of matching transaction descriptors including, for example, a same merchant descriptor, card number, transaction date and time, and currency. The dispute alert processor 140 may generate a weighted sum of the matching transaction descriptors. The disputed transaction may be determined to match a recorded transaction when the weighted sum of the matching transaction descriptors between the two transactions exceeds a threshold.

If the dispute alert processor 140 determines that the disputed transaction does not match any of the recorded transactions stored at the dispute alert processor 140 (305-N), the dispute alert processor 140 may determine whether a match failed because the disputed transaction is a duplicate transaction (307). For example, the dispute alert processor 140 may be unable to locate a match for the disputed transaction when all recorded transactions matching the disputed transaction are flagged with a duplicate alert.

In some example embodiments, the dispute alert processor 140 may flag a recorded transaction with a duplicate alert the first time the dispute alert processor 140 matches the recorded transaction to a disputed transaction. As such, in the event the dispute alert processor 140 subsequently receives another dispute alert for the same disputed transaction, the dispute alert processor 140 may be able to determine, based on the duplicate alert, that the disputed transaction has already been processed. Thus, if the dispute alert processor 140 determines that the match failed because the disputed transaction is a duplicate transaction (307-Y), the dispute alert processor 140 may provide a corresponding update of the status of the disputed transaction (308). For example, the dispute alert processor 140 may update (e.g., by executing one or more Structured Query Language operations) a status of the disputed transaction stored at the dispute alert processor 140 (e.g., the data store 145) to indicate that the disputed transaction is a duplicate transaction. The dispute alert processor 140 may further provide an update of the status of the disputed transaction to the card issuer 120, the dispute alert provider 130, and/or the merchant 150 (e.g., via one or more web service requests).

Alternately or additionally, if the dispute alert processor 140 determines that the match did not fail because the disputed transaction is a duplicate (307-N), the dispute alert processor 140 may perform one or more corrective operations (310). For example, the dispute alert processor 140 may perform updates to resolve inconsistencies (e.g., formatting) in the transaction descriptors associated with disputed and/or recorded transactions. In some example embodiments, the one or more corrective operations may be adapted to improve a likelihood that the disputed transaction may be successfully matched to a recorded transaction (e.g., during an automatic reprocessing of the disputed transaction).

If the dispute alert processor 140 determines that the disputed transaction matches at least one recorded transaction stored at the dispute alert processor 140 (305-Y), the dispute alert processor 140 may determine whether the disputed transaction matches at least one recorded transaction stored by a corresponding merchant's customer relationship management system (311). The dispute alert processor 140 may perform an additional verification of the disputed transaction after the disputed transaction is matched to at least one recorded transaction stored at the dispute alert processor 140. For example, the dispute alert processor 140 may execute one or more scripts (e.g., in PHP: Hypertext Preprocessor) that calls a plurality of web service requests (e.g., Hypertext Transfer Protocol GET, POST, and/or PUT requests) to retrieve recorded transactions from the customer relationship management system 155 of the merchant 150. To determine whether the disputed transaction matches at least one recorded transaction stored by the customer relationship management system 155, the dispute alert processor 140 may generate weighted sums of matching transaction descriptors between the disputed transaction and one or more recorded transactions from the customer relationship management system 155.

If the dispute alert processor 140 determines that the disputed transaction does not match at least one recorded transaction stored by the corresponding merchant's customer relationship management system (311-N), the dispute alert processor 140 may determine that an external failure has occurred (312). For instance, the dispute alert processor 140 may determine that a failure has occurred at the customer relationship management system 155 of the merchant 150. Moreover, in response to determining that an external failure has occurred, the dispute alert processor 140 may perform one or more corrective operations (310). For example, the dispute alert processor 140 may perform updates to resolve inconsistencies (e.g., formatting) in the transaction descriptors associated with disputed and/or recorded transactions.

Alternately or additionally, if the dispute alert processor 140 determines that the disputed transaction does match at least one recorded transaction stored by the corresponding merchant's customer relationship management system (311-

Y), the dispute alert processor 140 may determine whether the disputed transaction has already been refunded and/or cancelled by the customer relationship management system (313). For example, the dispute alert processor 140 may execute one or more web service requests (e.g., Hypertext Transfer Protocol GET, POST, and/or PUT requests) to retrieve data from the customer relationship management system 155 indicating whether the disputed transaction has already been refunded and/or canceled.

If the dispute alert processor 140 determines that the disputed transaction has not already been refunded and/or canceled by the customer relationship management system (313-N), the dispute alert processor 140 may cause the merchant's customer relationship management system to refund the disputed transaction (314). For example, if data retrieved from the customer relationship management system 155 indicates that the disputed transaction has not been refunded and/or canceled, the dispute alert processor 140 may execute one or more web service requests (e.g., Hypertext Transfer Protocol GET, POST, and/or PUT requests) that causes the customer relationship management system 155 to issue a refund (e.g., to the user 110).

The dispute alert processor 140 may further determine whether the refund was successfully issued by the merchant's customer relationship management system (315). For example, the dispute alert processor 140 may determine whether the refund was successfully issued by the customer relationship management system 155 based on a refund status provided by the customer relationship management system 155 (e.g., pushed or pulled via one or more web service requests). If the dispute alert processor 140 determines that the refund was successfully issued (315-Y), the dispute alert processor 140 may determine that the disputed transaction has been resolved (316). The dispute alert processor 140 may further provide a corresponding update of the status of the disputed transaction (308). For example, the dispute alert processor 140 update (e.g., by executing one or more Structured Query Language operations) a status of the disputed transaction stored at the dispute alert processor 140 (e.g., the data store 145) to indicate that the disputed transaction has been resolved (e.g., refunded). The dispute alert processor 140 may further provide an update of the status of the disputed transaction to the card issuer 120, the dispute alert provider 130, and/or the merchant 150 (e.g., via one or more web service requests).

Alternately or additionally, if the dispute alert processor determines that the refund was not successfully issued (315-N), the dispute alert processor 140 may determine that an external failure has occurred (312). For instance, the dispute alert processor 140 may determine that a failure has occurred at an external entity such as the customer relationship management system 155 of the merchant 150. Moreover, in response to determining that an external failure has occurred, the dispute alert processor 140 may perform one or more corrective operations (310). For example, the dispute alert processor 140 may perform updates to resolve inconsistencies (e.g., formatting) in the transaction descriptors associated with disputed and/or recorded transactions.

Alternately or additionally, if the dispute alert processor 140 determines that the disputed transaction has already been refunded and/or canceled by the customer relationship management system (313-Y), the dispute alert processor 140 may determine that the disputed transaction has been resolved (316). The dispute alert processor 140 may further provide a corresponding update of the status of the disputed transaction (308). For example, the dispute alert processor 140 update (e.g., by executing one or more Structured Query Language operations) a status of the disputed transaction stored at the dispute alert processor 140 (e.g., the data store 145) to indicate that the disputed transaction has been resolved (e.g., refunded). The dispute alert processor 140 may further provide an update of the status of the disputed transaction to the card issuer 120, the dispute alert provider 130, and/or the merchant 150 (e.g., via one or more web service requests).

FIG. 4 depicts a graphic user interface 400, in accordance with some example embodiments. Referring to FIGS. 1-4, the graphic user interface 400 may be provided by the dispute alert processor 140 (e.g., the user interface module 220) at, for example, operation 308 of the process 300.

As shown in FIG. 4, the graphic user interface 400 may include a prevention analytics panel 410. The prevention analytics panel 410 may display the disputed transactions corresponding to a merchant's (e.g., the merchant 150) dispute alerts. The disputed transactions may be sorted based on one or more user selectable (e.g., via a dropdown menu 415) transaction descriptors including, for example, price point, country, product, and bank identification number. The one or more user selectable transaction descriptors may further include one or more specific affiliates, which may be third party entities (e.g., high traffic news websites) contracted by a merchant to boost sales by through endorsements and other advertisements.

In some example embodiments, the graphic user interface 400 may further include separate panels for different dispute alert providers. For example, as shown in FIG. 4, the graphic user interface 400 may include a first dispute alert provider panel 422 and a second dispute alert provider panel 424. Each of the first dispute alert provider panel 422 and the second dispute alert provider panel 424 may display data associated with dispute alerts originating from a corresponding dispute alert provider. For example, the first dispute alert provider panel 422 may display transaction descriptors for disputed transactions that correspond to dispute alerts from one dispute alert provider. The second dispute alert provider panel 424 may display transaction descriptors for disputed transaction that correspond to dispute alerts from a different dispute alert provider. The transaction descriptors may include, for example, an identifier assigned by the dispute alert process 140, a case identifier, an order identifier, a received date, a transaction date, an amount, a bank identification number, the last four digits of the corresponding payment card, a card issuer, a merchant identifier, and a descriptor.

In some example embodiments, the graphic user interface 400 may further additional panels for at-a-glance statistics. For example, the graphic user interface 400 may include an overall dispute alert count panel 432 that displays a total number of dispute alerts for a particular merchant (e.g., the merchant 150). The graphic user interface 400 may also include separate panels that show a total number of dispute alerts from each individual dispute alert provider. For example, a first chargeback provider alert count panel 434 may display a total number of dispute alerts originating from one dispute alert provider while a second chargeback provider alert count panel 436 may display a total number of dispute alerts originating from a different dispute alert provider.

FIG. 5 depicts a flowchart illustrating a process 500 for processing one or more dispute alerts. Referring to FIGS. 1-2 and 5, the process 50 may be performed by the dispute alert processor 140.

The dispute alert processor 140 may receive, from a dispute alert provider, a dispute alert for a disputed transaction (502). For example, the dispute alert processor 140 may receive a dispute alert pushed (e.g., using one or more web service requests) from the dispute alert provider 130 and/or the card issuer 120. The dispute alert may include a plurality of transaction descriptors characterizing various aspects of the disputed transaction including, for example, transaction descriptors that indicate when and where the disputed transaction was executed, the current status of the disputed transaction, and an amount of the disputed transaction.

The dispute alert processor 140 may execute a first web request to retrieve a first recorded transaction from a customer relationship management system (504). For example; the dispute alert processor 140 may execute one or more Hypertext Transfer Protocol requests (e.g., GET) to retrieve one or more recorded transactions from the customer relationship management system 155 of the merchant 150.

The dispute alert processor 140 may determine whether the disputed transaction matches the first recorded transaction (505). In some example embodiments, the dispute alert processor 140 may generate a weighted sum of matching transaction descriptors between the disputed transaction and the first recorded transactions. For example, the disputed transaction and a recorded transaction may share a plurality of matching transaction descriptors including, for example, a same merchant descriptor, card number, transaction date and time, and currency. The dispute alert processor 140 may generate a weighted sum of the matching transaction descriptors.

The dispute alert processor 140 may determine that the disputed transaction matches the first recorded transaction (505-Y). For instance, the disputed transaction may be determined to match a recorded transaction when the weighted sum of the matching transaction descriptors between the two transactions exceeds a threshold. As such, the dispute alert processor 140 may execute a second web request to cause the customer relationship management system to issue a refund for the disputed transaction (506). For example, the dispute alert processor 140 may execute one or more Hypertext Transfer Protocol requests (e.g., PUT) to cause the customer relationship management system 155 to issue a refund (e.g., the user 110).

Alternately, if the dispute alert processor 140 determines that the disputed transaction does not match the first recorded transaction (505-N), the dispute alert processor 140 may determine that an external failure has occurred (506). For instance, the dispute alert processor 140 may determine that a failure has occurred at the customer relationship management system 155 of the merchant 150. Moreover, in response to determining that the disputed transaction does not match the first recorded transaction, the dispute alert processor 140 may further perform one or more corrective operations (508). For example, the dispute alert processor 140 may perform updates to resolve inconsistencies (e.g., formatting) in the transaction descriptors associated with disputed and/or recorded transactions.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. The logic flows depicted herein may include different and/or additional operations than shown without departing from the scope of the present disclosure. Moreover, one or more operations of these logic flows may be omitted and/or repeated without departing from the scope of the present disclosure.

What is claimed is:

1. A non-transitory computer-readable medium containing instructions to configure a processor to perform operations comprising:
   selecting at least one merchant from among a first plurality of merchants available for selection from a first web portal associated with a first financial institution;
   providing first authentication information associated with the at least one merchant and with the first financial institution into the first web portal;
   subsequent to providing the first authentication information, accessing, via the first web portal, first chargeback records for at least one merchant;
   selecting the at least one merchant from among a second plurality of merchants available for selection from a second web portal associated with a second financial institution;
   providing second authentication information associated with the at least one merchant and with the second financial institution into the second web portal, the second authentication information being different than the first authentication information;
   subsequent to providing the second authentication information, accessing, via the second web portal, second chargeback records for the at least one merchant;
   accessing a plurality of transaction records for the at least one merchant;
   executing a comparison process to compare each transaction record of the plurality of transaction records to each chargeback record of the first chargeback records and the second chargeback records;
   detecting a match between a particular transaction record of the plurality of transaction records and a particular chargeback record of the first chargeback records or the second chargeback records;
   in response to detecting the match, generating a representation package;
   downloading the first chargeback records and the second chargeback records to a database; and
   transmitting the representation package to a remote computing device.

2. The non-transitory computer-readable medium of claim 1, wherein the representation package comprises a plurality of sections, the plurality of sections comprising a cover letter, order details, a delivery verification, and a checkout page.

3. The non-transitory computer-readable medium of claim 1, further containing instructions to configure the processor to perform operations comprising:
   receiving, from the at least one merchant, a request for a chargeback report.

4. The non-transitory computer-readable medium of claim 3, further containing instructions to configure the processor to perform operations comprising:
   in response to receiving the request, generating the chargeback report based on the first chargeback records or the second chargeback records downloaded to the database.

5. The non-transitory computer-readable medium of claim 1, wherein the first authentication information comprises a first username and a first password associated with the at least one merchant and the first financial institution, and wherein the second authentication information comprises a second username and a second password associated with the at least one merchant and the second financial institution.

6. The non-transitory computer-readable medium of claim 1, wherein the operation of downloading the first chargeback records and the second chargeback records to the database comprises saving the first chargeback records or the second chargeback records to the database as a character-separated values file or as a file for a spreadsheet application.

7. A method comprising:
   selecting at least one merchant from among a first plurality of merchants available for selection from a first web portal associated with a first financial institution;
   providing first authentication information associated with the at least one merchant and with the first financial institution into the first web portal;
   subsequent to providing the first authentication information, accessing, via the first web portal, first chargeback records for at least one merchant;
   selecting the at least one merchant from among a second plurality of merchants available for selection from a second web portal associated with a second financial institution;
   providing second authentication information associated with the at least one merchant and with the second financial institution into the second web portal, the second authentication information being different than the first authentication information;
   subsequent to providing the second authentication information, accessing, via the second web portal, second chargeback records for the at least one merchant;
   accessing a plurality of transaction records for the at least one merchant;
   executing a comparison process to compare each transaction record of the plurality of transaction records to each chargeback record of the first chargeback records and the second chargeback records;
   detecting a match between a particular transaction record of the plurality of transaction records and a particular chargeback record of the first chargeback records or the second chargeback records;
   in response to detecting the match, generating a representation package;
   downloading the first chargeback records and the second chargeback records to a database; and
   transmitting the representation package to a remote computing device.

8. The method of claim 7, wherein the representation package comprises a plurality of sections, the plurality of sections comprising a cover letter, order details, a delivery verification, and a checkout page.

9. The method of claim 7, further comprising:
   receiving, from the at least one merchant, a request for a chargeback report.

10. The method of claim 9, further comprising:
    in response to receiving the request, generating the chargeback report based on the first chargeback records or the second chargeback records downloaded to the database.

11. A system comprising:
    a processor; and
    a memory, wherein the processor and the memory are configured to perform operation, comprising:

selecting at least one merchant from among a first plurality of merchants available for selection from a first web portal associated with a first financial institution;

providing first authentication information associated with the at least one merchant and with the first financial institution into the first web portal;

subsequent to providing the first authentication information, accessing, via the first web portal, first chargeback records for at least one merchant;

selecting the at least one merchant from among a second plurality of merchants available for selection from a second web portal associated with a second financial institution;

providing second authentication information associated with the at least one merchant and with the second financial institution into the second web portal, the second authentication information being different than the first authentication information;

subsequent to providing the second authentication information, accessing, via the second web portal, second chargeback records for the at least one merchant;

accessing a plurality of transaction records for the at least one merchant;

executing a comparison process to compare each transaction record of the plurality of transaction records to each chargeback record of the first chargeback records and the second chargeback records;

detecting a match between a particular transaction record of the plurality of transaction records and a particular chargeback record of the first chargeback records or the second chargeback records;

in response to detecting the match, generating a representation package;

downloading the first chargeback records and the second chargeback records to a database; and transmitting the representation package to a remote computing device.

12. The system of claim 11, wherein the representation package comprises a plurality of sections, the plurality of sections comprising a cover letter, order details, a delivery verification, and a checkout page.

13. The system of claim 11, wherein the processor and the memory are further configured to perform operations comprising:

receiving, from the at least one merchant, a request for a chargeback report.

14. The system of claim 13, wherein the processor and the memory are further configured to perform operations comprising:

in response to receiving the request, generating the chargeback report based on the first chargeback records or the second chargeback records downloaded to the database.

\* \* \* \* \*